US011472535B2

(12) United States Patent
Worsham, II et al.

(10) Patent No.: US 11,472,535 B2
(45) Date of Patent: Oct. 18, 2022

(54) ROTORCRAFT FLY-BY-WIRE GO-AROUND MODE

(71) Applicant: Textron Innovations Inc., Providence, RI (US)

(72) Inventors: Robert Earl Worsham, II, Weatherford, TX (US); Luke Dafydd Gillett, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 327 days.

(21) Appl. No.: 16/877,365

(22) Filed: May 18, 2020

(65) Prior Publication Data

US 2020/0277041 A1    Sep. 3, 2020

Related U.S. Application Data

(63) Continuation of application No. 15/422,886, filed on Feb. 2, 2017, now Pat. No. 10,654,561.

(51) Int. Cl.
*B64C 13/00* (2006.01)
*B64C 13/50* (2006.01)
*B64C 27/06* (2006.01)
*B64C 27/82* (2006.01)
(Continued)

(52) U.S. Cl.
CPC ............ *B64C 13/503* (2013.01); *B64C 13/04* (2013.01); *B64C 27/06* (2013.01); *B64C 27/82* (2013.01); *G05D 1/085* (2013.01); *G05D 1/0858* (2013.01)

(58) Field of Classification Search
CPC ....... B64C 13/503; B64C 13/04; B64C 27/06; B64C 27/82; B64C 13/50; B64C 27/12; G05D 1/085; G05D 1/0858; B64D 31/04
See application file for complete search history.

(56) References Cited

U.S. PATENT DOCUMENTS 3,927,306 A    12/1975 Miller
4,577,275 A     3/1986 Adams et al.
(Continued)

FOREIGN PATENT DOCUMENTS

CN    101175909 A    5/2008
CN    103482081 A    1/2014
(Continued)

*Primary Examiner* — Ian Jen
(74) *Attorney, Agent, or Firm* — Slater Matsil, LLP

(57) ABSTRACT

A fly-by-wire system for a rotorcraft includes a computing device having control laws. The control laws are operable to engage a level-and-climb command in response to a switch of a pilot control assembly being selected. The level-and-climb command establishes a roll-neutral ("wings level") attitude with the rotorcraft increasing altitude. The switch may be disposed on a collective control of the pilot control assembly (e.g., a button on a grip of the collective control). Selection of the switch may correspond to a button depress. The level-and-climb command may include a roll command and a collective pitch command. One or more control laws may be further operable to increase or decrease forward airspeed in response to pilot engagement of the level-and-climb command. The level-and-climb command may correspond to a go-around maneuver, an abort maneuver, or an extreme-attitude-recovery maneuver to be performed by the rotorcraft.

20 Claims, 17 Drawing Sheets

(51) Int. Cl.
*B64C 13/04* (2006.01)
*G05D 1/08* (2006.01)

(56) References Cited

U.S. PATENT DOCUMENTS

| | | | |
|---|---|---|---|
| 4,801,110 A * | 1/1989 | Skutecki | G05D 1/0858 244/186 |
| 8,442,706 B2 | 5/2013 | Doeppner et al. | |
| 8,473,124 B2 | 6/2013 | Shue et al. | |
| 8,862,310 B2 | 10/2014 | Green et al. | |
| 9,126,677 B1 | 9/2015 | Curtis | |
| 9,189,963 B2 | 11/2015 | Iraudo et al. | |
| 9,472,107 B2 | 10/2016 | Lissajoux et al. | |
| 2008/0097658 A1 | 4/2008 | Shue et al. | |
| 2009/0317252 A1 | 12/2009 | Garcin et al. | |
| 2010/0168939 A1 | 7/2010 | Doeppner et al. | |
| 2014/0027565 A1 | 1/2014 | Marvin et al. | |
| 2014/0244079 A1 | 8/2014 | Iraudo et al. | |
| 2015/0329199 A1 | 11/2015 | Golborne et al. | |
| 2015/0364045 A1 | 12/2015 | Lissajoux et al. | |
| 2015/0375871 A1 | 12/2015 | Canale et al. | |
| 2015/0375872 A1 | 12/2015 | Canale et al. | |
| 2016/0152323 A1 | 6/2016 | Claffy et al. | |

FOREIGN PATENT DOCUMENTS

| | | |
|---|---|---|
| CN | 104603706 A | 5/2015 |
| CN | 105836107 A | 8/2016 |

* cited by examiner

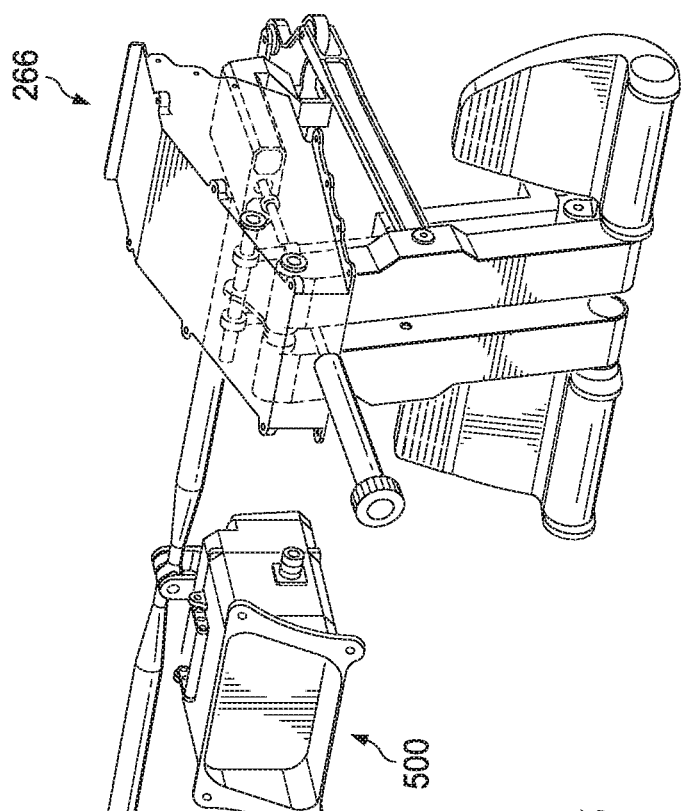
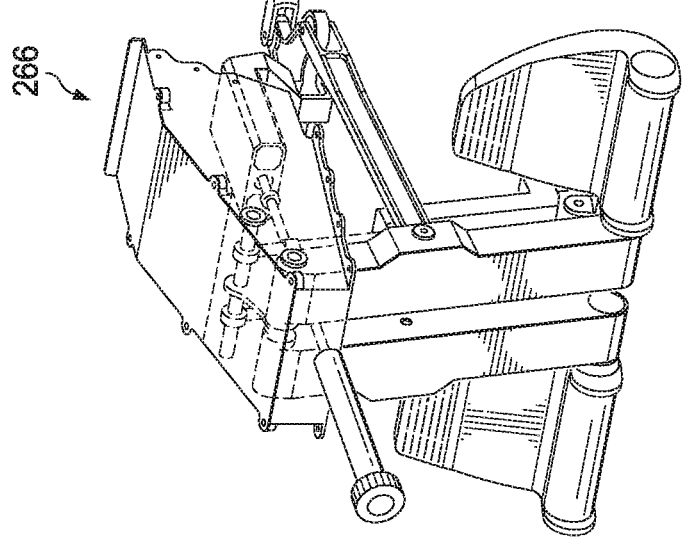
FIG. 5

FIG. 10
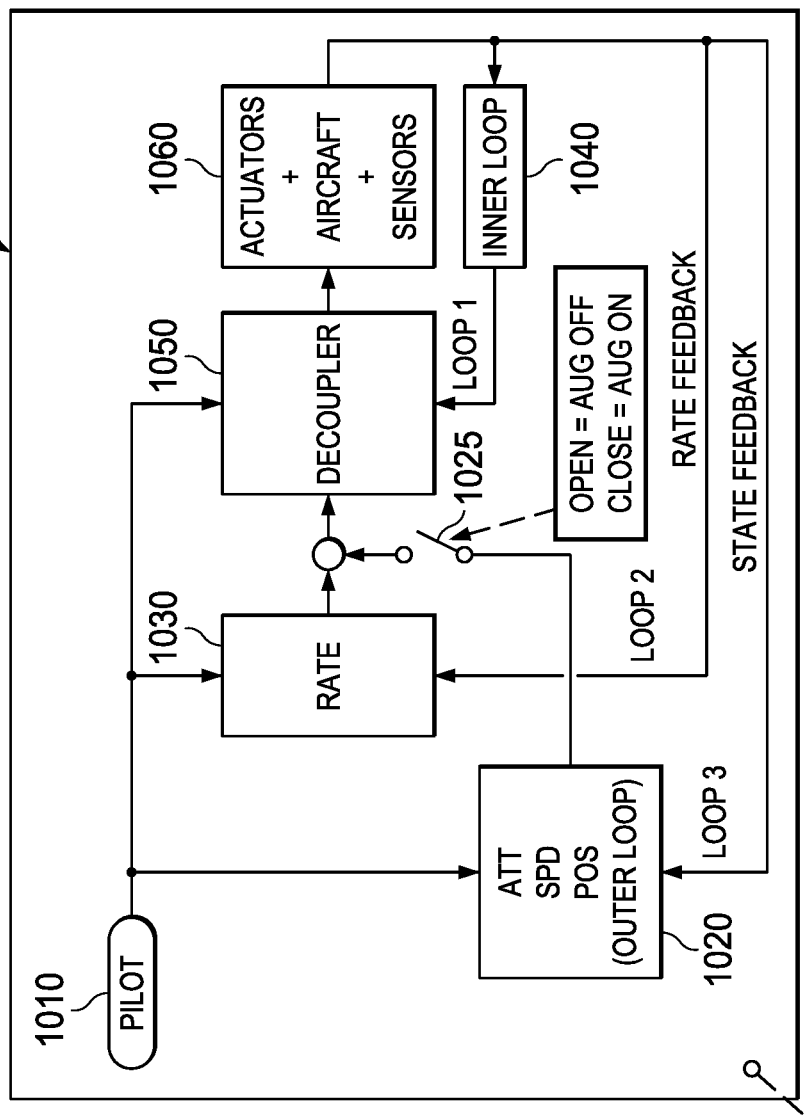
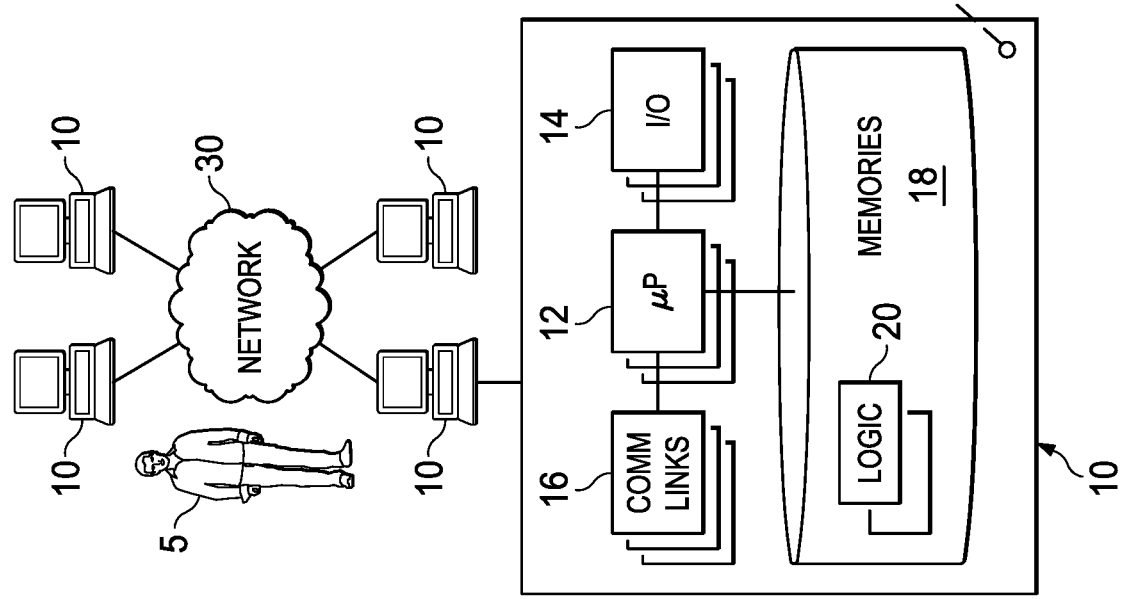

ROTORCRAFT FLY-BY-WIRE GO-AROUND MODE

PRIORITY INFO

This application claims the benefit to and is a continuation of U.S. patent application Ser. No. 15/422,866, filed on Feb. 2, 2017, and entitled "Rotorcraft Fly-by-Wire Go-Around Mode" which application is incorporated herein by reference.

TECHNICAL FIELD

The present disclosure generally relates to aircraft flight control systems, and more particularly, to rotorcraft fly-by-wire (FBW) control laws.

BACKGROUND

A rotorcraft may include one or more rotor systems. Examples of rotor systems include main rotor systems and tail rotor systems. A main rotor system may generate aerodynamic lift to support the weight of the rotorcraft in flight, and thrust to counteract aerodynamic drag and to move the rotorcraft in forward flight. A tail rotor system may generate thrust in correspondence to the main rotor system's rotation in order to counter torque created by the main rotor system.

SUMMARY

A system of one or more computers can be configured to perform particular operations or actions by virtue of having software, firmware, hardware, or a combination thereof installed on the system that in operation cause or causes the system to perform actions. One or more computer programs can be configured to perform particular operations or actions by virtue of including instructions that, when executed by a data processing apparatus, cause the apparatus to perform the actions.

A representative aspect includes a fly-by-wire (FBW) flight control system, including a rotorcraft flight control computer (FCC) having a control law. The control law is operable to engage a level-and-climb command in response to a switch of a pilot control assembly (PCA) being selected. The level-and-climb command is configured to establish a roll-neutral orientation of the rotorcraft and to increase altitude of the rotorcraft. Other embodiments of this aspect include corresponding computer systems, apparatuses, and computer programs recorded on one or more computer storage devices, each configured to perform actions of the methods.

Another representative aspect relates to a method including a step of operating a rotorcraft in a first operating condition of an FCS. The rotorcraft has an FCC in electrical communication between the FCS and a PCA. The method also includes the FCC receiving a first pilot command to engage a maneuver based on selection of a switch of the PCA. The method also includes, in response to the first pilot command to engage the maneuver, the FCC transitioning to a second operating condition, where the second operating condition includes the rotorcraft in a roll-neutral attitude and the rotorcraft increasing altitude. Other embodiments of this aspect include corresponding computer systems, apparatuses, and computer programs recorded on one or more computer storage devices, each configured to perform actions of the methods.

Yet another representative aspect includes a rotorcraft having a power train coupled to a body. The power train includes a power source and a drive shaft coupled to the power source. The rotorcraft also includes a rotor system coupled to the power train and further includes a plurality of rotor blades. It will be noted, however, that various rotorcraft embodiments may or may not include tail rotor blades (e.g., NOTAR embodiments). The rotorcraft also includes an FCS operable to change at least one operating condition of the rotor system. The rotorcraft also includes a PCA configured to receive commands from a pilot, where the FCS is a fly-by-wire flight control system in electrical communication with the PCA. The FCC is in electrical communication between the FCS and the PCA. The FCC is configured to receive, from a switch of the PCA, a first pilot command to engage a maneuver. The FCC is configured to, in response to the first pilot command to engage the maneuver, transition to a second operating condition of the rotor system, where the second operating condition of the rotor system includes the rotorcraft in a roll-neutral climb. Other embodiments of this aspect include corresponding computer systems, apparatuses, and computer programs recorded on one or more computer storage devices, each configured to perform the actions of the methods.

Representative embodiments of the present disclosure may provide one or more technical advantages. A technical advantage of one embodiment may include a capability to improve pilot control of a rotorcraft and reduce pilot workload. Another technical advantage of an embodiment may include a capability to decouple or separate rotorcraft motions corresponding to different flight characteristics in order to engage a maneuver with reduced pilot workload. Yet another technical advantage of an embodiment may include a capability to depress a button of a collective control to instruct a fly-by-wire system to initiate a go-around maneuver with minimal, or otherwise reduced, input from a pilot.

Certain embodiments may include some, all, or none of the above advantages. One or more other technical advantages may be readily apparent to those skilled in the art upon review of the Figures, descriptions, and claims included herein.

BRIEF DESCRIPTION OF THE DRAWINGS

Representative aspects of the present disclosure may be understood from the following detailed description when read in conjunction with the accompanying Figures. It is noted that, in accordance with standard practice in the industry, various features may not be drawn to scale. For example, dimensions of various features may be arbitrarily increased or reduced for clarity of illustration or description. Corresponding numerals and symbols in different Figures generally refer to corresponding parts, unless otherwise indicated.

FIG. 5 representatively illustrates an installation of pedal assemblies in accordance with an embodiment.

FIG. 10 representatively illustrates a three-loop flight control system in accordance with an embodiment.

DETAILED DESCRIPTION

Representative embodiments are discussed in detail below. It should be appreciated, however, that concepts disclosed herein may be embodied in a variety of contexts, and that specific embodiments discussed herein are merely illustrative and are not intended to limit the scope of the claims. Furthermore, it should be understood that various changes, substitutions, and alterations can be made herein without departing from the spirit and scope as defined by the appended claims.

Figure 1:
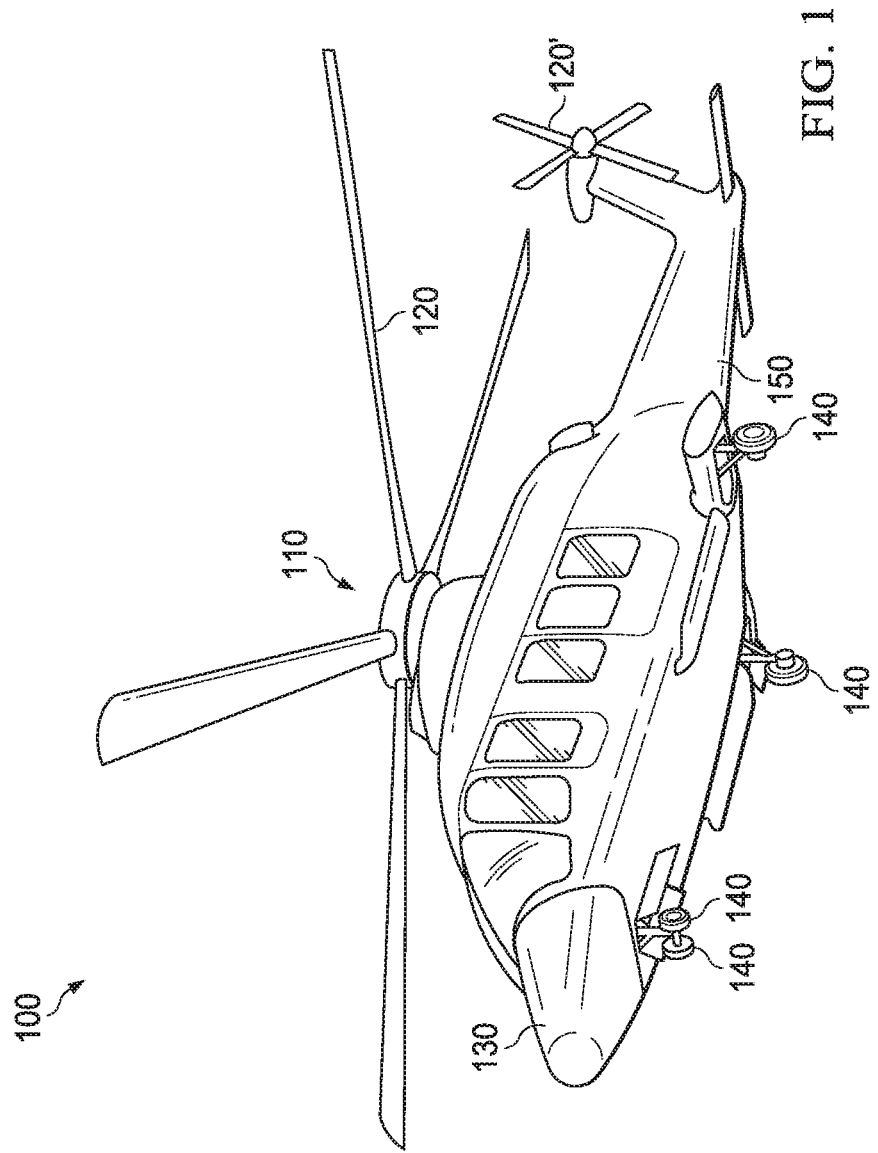
FIG. 1 representatively illustrates a rotorcraft in accordance with an embodiment.

FIG. 1 illustrates a rotorcraft 100 according to a representative embodiment. Rotorcraft 100 includes rotor system 110, main rotor blades 120, fuselage 130, landing gear 140, and tail boom 150. Rotor system 110 may rotate main rotor blades 120. Rotor system 110 may include a control system for selectively controlling pitch of each blade 120 in order to selectively control direction, thrust, and lift of rotorcraft 100. Fuselage 130 comprises the body of rotorcraft 100 and may be coupled to rotor system 110 such that rotor system 110 and main rotor blades 120 move fuselage 130 through the air in flight. Landing gear 140 support rotorcraft 100 during landing or when rotorcraft 100 is at rest on the ground. Tail boom 150 represents the rear section of rotorcraft 100 and has components of rotor system 110 and tail rotor blades 120'. Tail rotor blades 120' counter torque effect created by rotor system 110 and main rotor blades 120. Teachings of certain embodiments relating to rotor systems described herein may apply to rotor system 110 or other rotor systems, such as other tilt rotor or helicopter rotor systems (e.g., tandem rotor, coaxial rotor, or the like). It should also be appreciated that representative embodiments of rotorcraft 100 may apply to aircraft other than rotorcraft, such as airplanes and unmanned aircraft, or the like.

A pilot may manipulate one or more pilot flight controls in order to achieve controlled aerodynamic flight. Inputs provided by the pilot to the pilot flight controls may be transmitted mechanically or electronically (for example, via a fly-by-wire system) to flight control devices. Flight control devices may include devices operable to change flight characteristics of the aircraft. Representative flight control devices may include a control system operable to change a configuration of main rotor blades 120 or tail rotor blades 120'.

Figure 2:
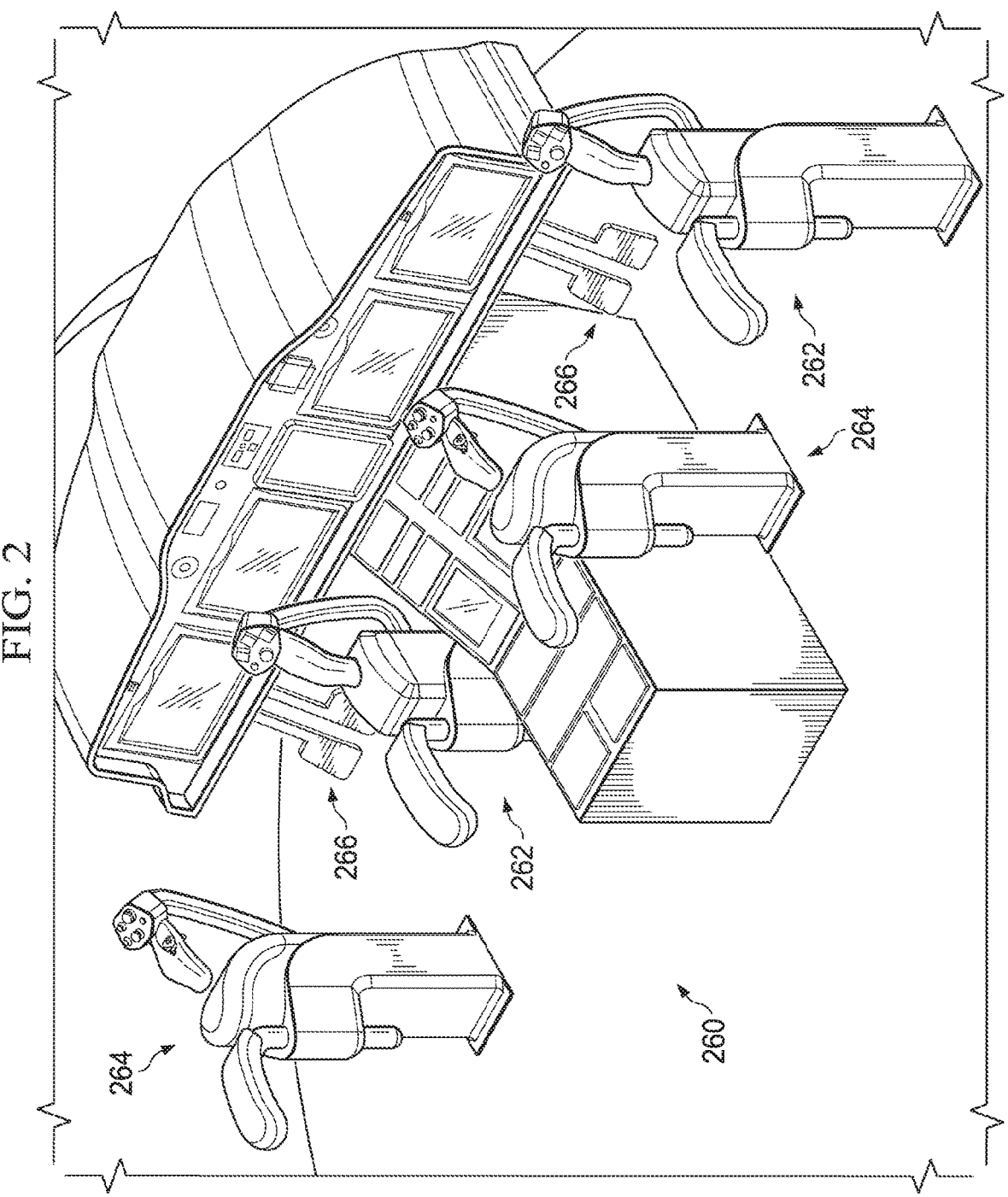
FIG. 2 representatively illustrates a cockpit configuration in accordance with an embodiment.

FIG. 2 illustrates a cockpit configuration 260 of rotorcraft 100 according to a representative embodiment. Rotorcraft 100 may include, e.g., three sets of pilot flight controls (e.g., cyclic control assemblies 262, collective control assemblies 264, and pedal assemblies 266). In accordance with a representative embodiment, a set comprising each different pilot flight control assembly is provided for a pilot and a co-pilot (both of which may be referred to as a "pilot" for purposes of discussion herein).

In general, cyclic pilot flight controls may allow a pilot to impart cyclic configurations to main rotor blades 120. Varied cyclic configurations of main rotor blades 120 may cause rotorcraft 100 to tilt in a direction specified by the pilot. For tilting forward and back (pitch) or tilting sideways (roll), the angle of attack of main rotor blades 120 may be altered with cyclic periodicity during rotation of rotor system 110, thereby creating variable amounts of lift at varied points in the rotation cycle. Alteration of cyclic configuration of main rotor blades 120 may be accomplished by input from cyclic control assembly 262.

Collective pilot flight controls may allow a pilot to impart collective configurations (e.g., collective blade pitch) to main rotor blades 120. Collective configurations of main rotor blades 120 may change overall lift produced by main rotor blades 120. For increasing or decreasing overall lift in main rotor blades 120, the angle of attack for all main rotor blades 120 may be collectively altered by equal amounts and at the same time, resulting in ascent, descent, acceleration, and deceleration. Alteration of collective configuration of main rotor blades 120 may be accomplished by input from collective control assembly 264.

Anti-torque pilot flight controls may allow a pilot to change the amount of anti-torque force applied to rotorcraft 100. Tail rotor blades 120' may operate to counter torque created by rotor system 110 and main rotor blades 120. Anti-torque pilot flight controls may change the amount of anti-torque force applied to change a heading of rotorcraft 100. For example, providing anti-torque force greater than the torque effect created by rotor system 110 and main rotor blades 120 may cause rotorcraft 100 to rotate in a first direction, whereas providing anti-torque force less than the torque effect created by rotor system 110 and main rotor blades 120 may cause rotorcraft 100 to rotate in a second direction opposite the first direction. In some embodiments, anti-torque pilot flight controls may change the amount of anti-torque force applied by changing the pitch of tail rotor blades 120', thereby increasing or reducing thrust produced by tail rotor blades 120' and causing the nose of rotorcraft 100 to yaw in a direction corresponding to application of input from pedal assembly 266.

In other embodiments, rotorcraft 100 may include additional or different anti-torque devices, such as a rudder or a no-tail-rotor (NOTAR) anti-torque device. Conjunctive or alternative anti-torque embodiments may be operable to change an amount of anti-torque force provided by such additional or different anti-torque device.

In some embodiments, cyclic control assembly 262, collective control assembly 264, and pedal assemblies 266 may be used in a fly-by-wire (FBW) system. In an example as representatively illustrated in FIG. 2, each cyclic control assembly 262 is located to the right of a pilot seat, each collective control assembly 264 is located to the left of a pilot seat, and each pedal assembly 266 is located in front of a pilot seat. In other embodiments, cyclic control assemblies 262, collective control assemblies 264, and pedal assemblies 266 may be located in any suitable location of a cockpit configuration.

In some embodiments, cyclic control assembly 262, collective control assembly 264, and pedal assemblies 266 may be in mechanical communication with trim assemblies that convert mechanical inputs into FBW flight control commands. These trim assemblies may include, among other items, measurement devices for measuring mechanical inputs (e.g., measuring or otherwise determining input position) and trim motors for back-driving center positions of cyclic control assembly 262, collective control assembly 264, or pedal assemblies 266.

Figure 3:
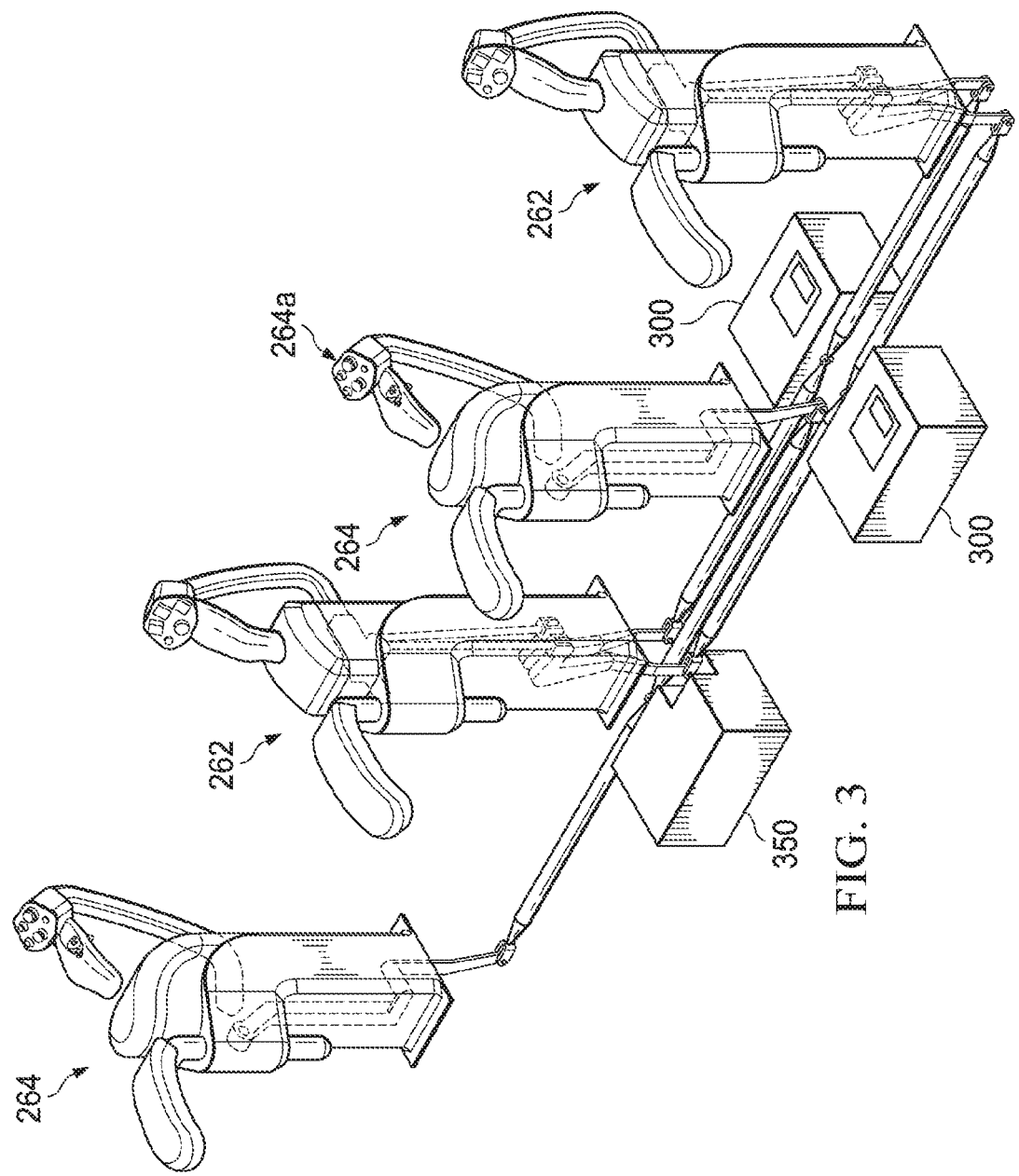
FIG. 3 representatively illustrates an installation of cyclic control assemblies and collective control assemblies in accordance with an embodiment.

For example, FIG. 3 representatively illustrates an installation of two cyclic control assemblies 262 and two collective control assemblies 264 according to an embodiment. In this example, the cyclic control assemblies 262 and collective control assemblies 264 are coupled to three integrated trim assemblies: two cyclic trim assemblies 300 and a collective trim assembly 350. One of the cyclic trim assemblies 300 manages left/right cyclic tilting movements (e.g., roll) and the other cyclic trim assembly 300 manages front/back cyclic tilting movements (e.g., pitch).

Cyclic trim assemblies 300 and collective trim assembly 350 are operable to receive and measure mechanical communications of cyclic and collective motions from a pilot. In a representative aspect, cyclic trim assemblies 300 and collective trim assembly 350 may embody components of a FBW flight control system, and measurements from cyclic trim assemblies 300 and collective trim assembly 350 may be sent to a flight control computer (FCC) operable to instruct rotor system 110 to change a position of main rotor blades 120 based on received or otherwise determined measurements. For example, the FCC may be in communication with actuators or other devices operable to change the pitch or position of main rotor blades 120.

Figure 4:
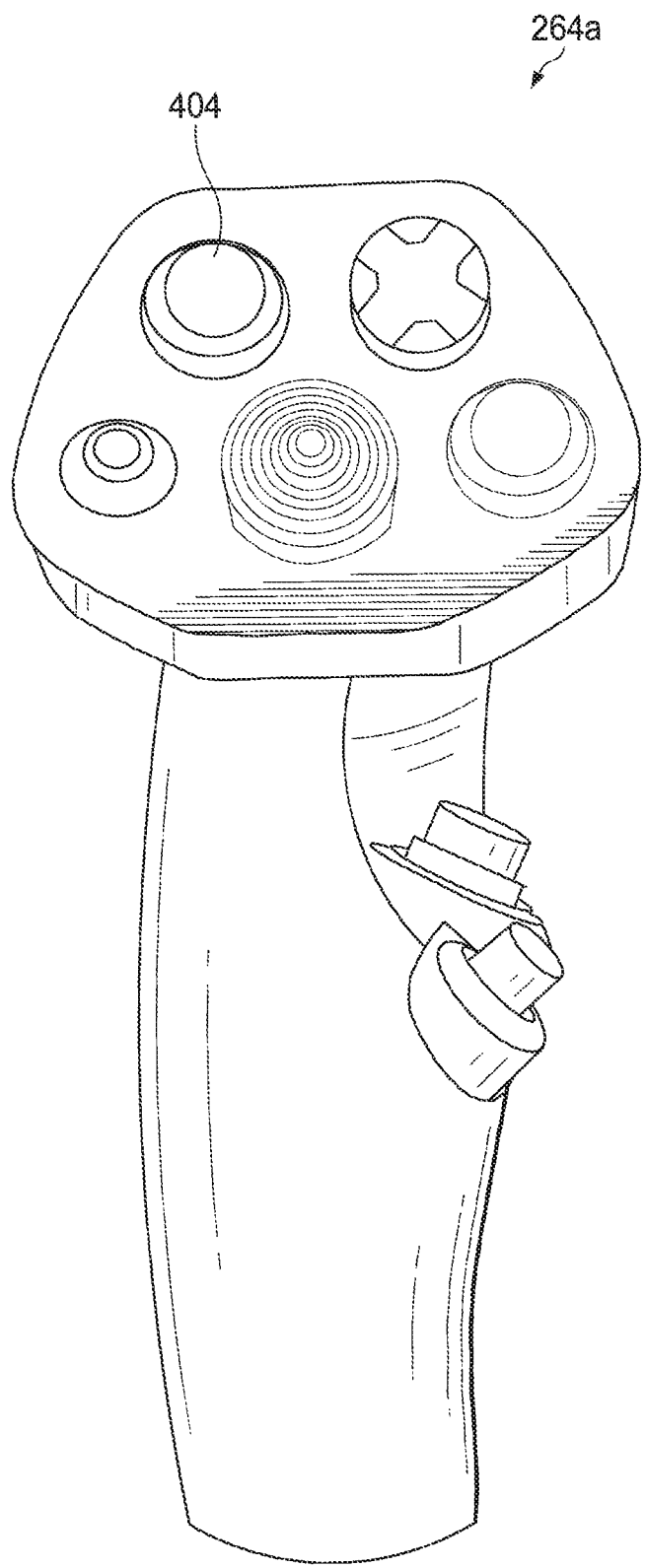
FIG. 4 representatively illustrates a grip portion of a collective control assembly in accordance with an embodiment.

As representatively illustrated in FIG. 3 and FIG. 4, collective control assemblies 264 may include a collective control grip 264a having a go-around button 404 disposed thereon. In a representative aspect, go-around button 404 may be configured to engage a go-around maneuver, an abort maneuver, or a recovery-from-extreme attitude maneuver when go-around button 404 is pressed, as later described in greater detail.

FIG. 5 representatively illustrates an installation of pedal assemblies 266 in accordance with an embodiment. Two pedal assemblies 266 are coupled to an anti-torque trim assembly 500. Pedal linkages are in mechanical communication, e.g., via a rocker arm and pedal adjustment linkages. The rocker arm is operable to rotate about a point of rotation such that pushing in one pedal causes the pedal adjustment linkage to rotate the rocker arm, which in turn causes the pedal adjustment linkage to push out the other pedal in an opposite direction.

Rotating the rocker arm also causes a trim linkage to reposition a mechanical input associated with anti-torque trim assembly 500. In this manner, the pilot can mechanically communicate anti-torque commands to anti-torque trim assembly 500 by moving the pedals. Furthermore, trim linkages couple adjacent pedal assemblies 266 together such that pilot pedals and co-pilot pedals are in mechanical communication.

Figure 6:
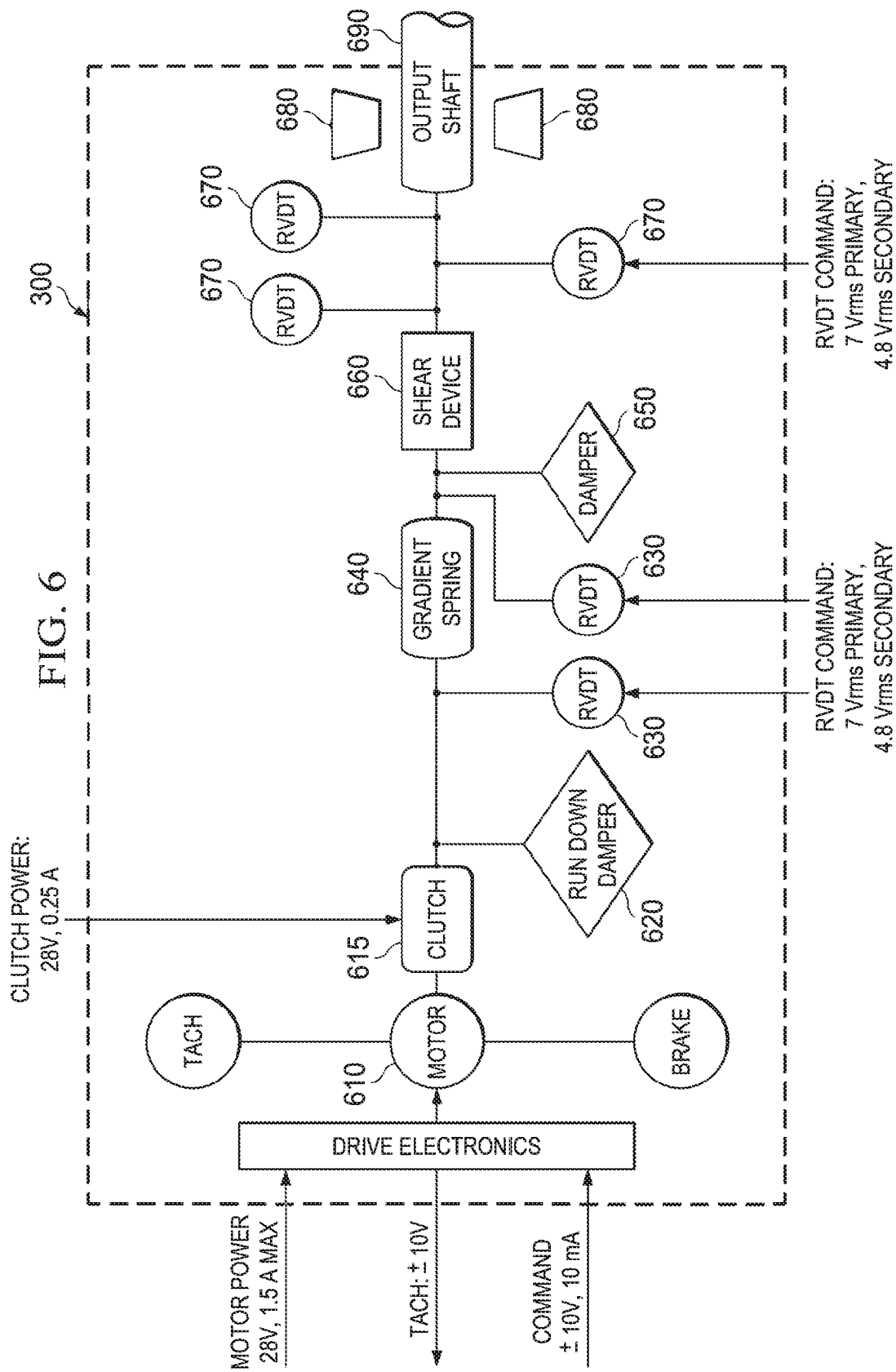
FIG. 6 representatively illustrates a cyclic trim assembly in accordance with an embodiment.
Figure 7:
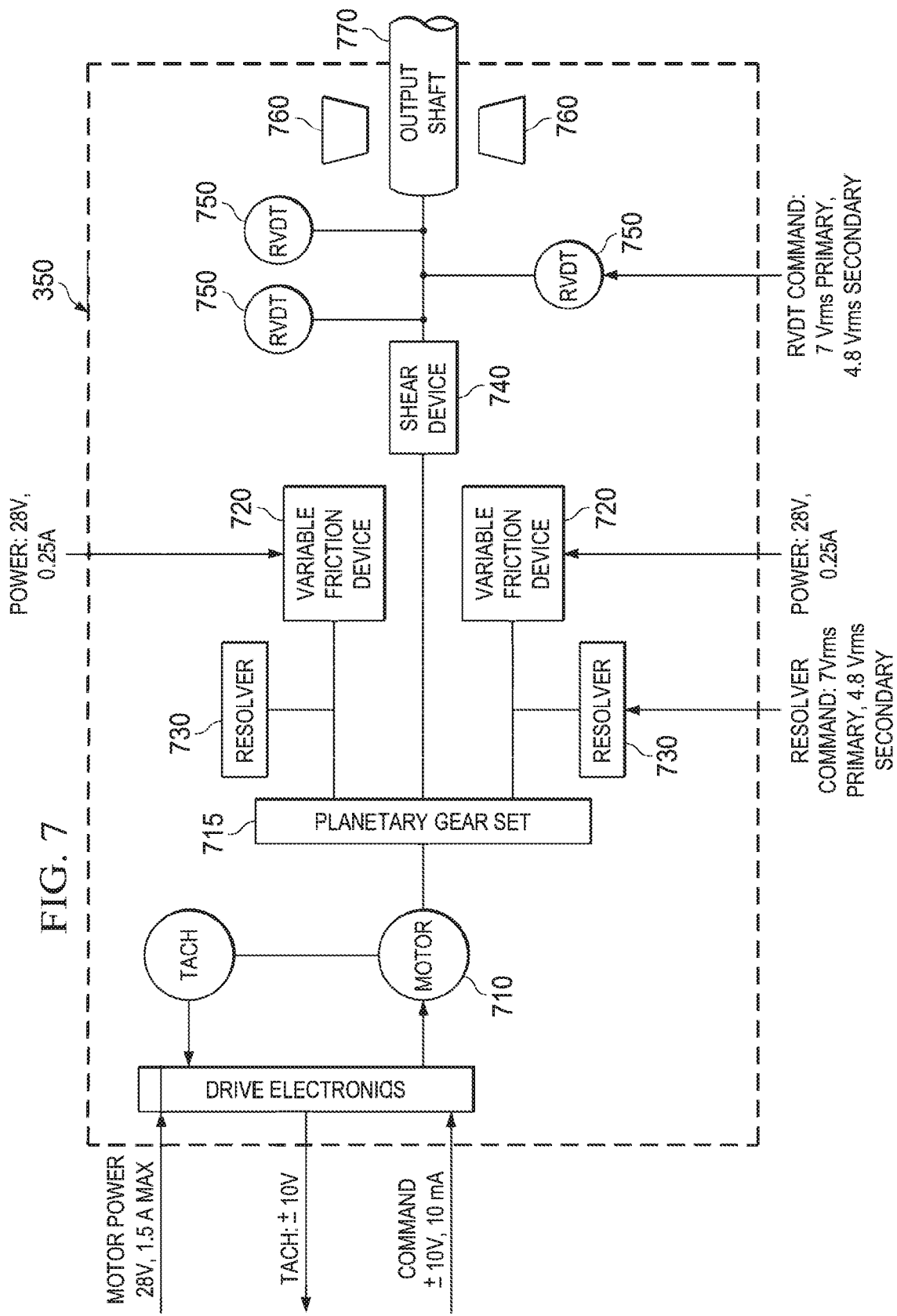
FIG. 7 representatively illustrates a collective trim assembly in accordance with an embodiment.
Figure 8:
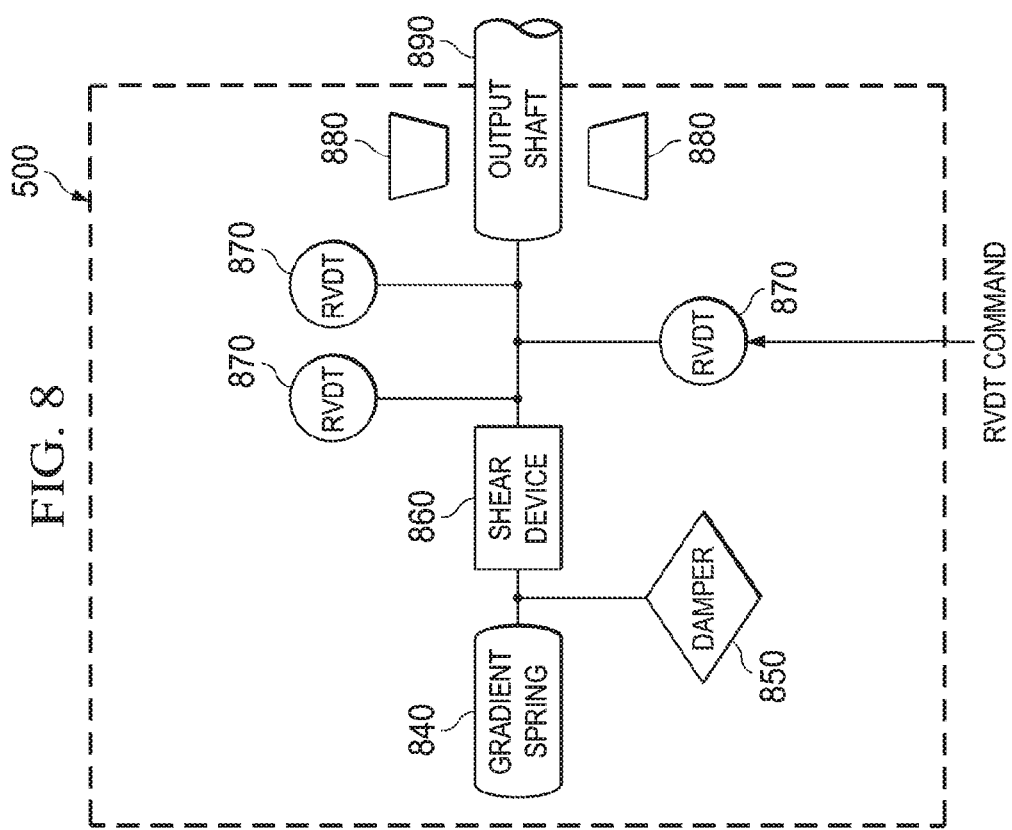
FIG. 8 representatively illustrates an anti-torque trim assembly in accordance with an embodiment.

FIG. 6, FIG. 7, and FIG. 8 show the trim assemblies (300, 350, 500) of FIG. 3 and FIG. 5 according to a representative embodiment. FIG. 6 shows cyclic trim assembly 300 according to an embodiment, FIG. 7 shows collective trim assembly 350 according to an embodiment, and FIG. 8 shows anti-torque trim assembly 500 according to an embodiment.

FIG. 6 representatively illustrates an embodiment of cyclic trim assembly 300 having a trim motor 610, a clutch 615, a run-down damper 620, position measurement devices 630, a gradient spring 640, a damper 650, a shear device 660, position measurement devices 670, mechanical stop devices 680, and an output shaft 690. Although output shaft 690 may be described as a single shaft, it will be appreciated that output shaft 690 may have multiple components. For example, output shaft 690 may include two shafts separated by gradient spring 640. In another example, output shaft 690 may have a single shaft with a torsion spring attached thereto.

In operation according to an embodiment, output shaft 690 and cyclic control assemblies 262 are in mechanical communication such that movement of grip (630) results in movement of output shaft 690, and movement of output shaft 690 likewise results in movement of grip (630). Movement of output shaft 690 may be measured or otherwise determined by position measurement devices 630 and 670. The measurements from measurement devices 630 and 670 may be used to instruct rotor system 110 to change the position of main rotor blades 120.

Cyclic trim assembly 300 may operate in three modes of operation. In a first mode of operation, clutch 615 is engaged and trim motor 610 drives output shaft 690. This first mode of operation may represent, for example, operation of cyclic trim assembly 300 during auto-pilot operations. In this example, trim motor 610 may drive movement of output shaft 690 so as to drive movement of grip (630) of cyclic control assembly 262. Position measurement devices 630 and 670 may also measure how trim motor 610 drives output shaft 690 and communicate these measurements to rotor system 110.

In a second mode of operation, clutch 615 is disengaged and the pilot drives output shaft 690 by way of cyclic control assembly 262. In this example, the pilot changes the position of output shaft 690, which may be measured by position measurement devices 630 and 670. Position measurement devices 630 and 670 may measure how the pilot drives output shaft 690 and communicate these measurements to rotor system 110.

In a third mode of operation, clutch 615 is engaged and trim motor 610 holds its output arm at a trim position so as to provide a ground point for output shaft 690. In this example, the pilot may change the position of output shaft 690 about the trim position set by trim motor 610. When the pilot releases grip (630), grip (630) may move to the trim position corresponding to the position established by trim motor 610. In some embodiments, the first and third modes of operations may be combined such that trim motor 610 moves the trim position during operation.

Thus, trim motor 610 may provide cyclic force or trim to cyclic control assembly 262 through output shaft 690. In an embodiment, trim motor 610 may be a 28 volt DC permanent magnet motor. In operation, trim motor 610 may provide an artificial-force feel (or "force feedback") for a flight control system (FCS) about an anchor point (or "detent"). Clutch 615 provides a mechanism for engaging and disengaging trim motor 610.

FIG. 7 shows an embodiment of collective trim assembly 350 having a trim motor 710, planetary gear set 715, variable friction devices 720, resolvers 730, a shear device 740, position measurement devices 750, mechanical stop devices 760, and an output shaft 770. Output shaft 770 may be coupled to various linkages. Although output shaft 770 may be described as a single shaft, it will be appreciated that output shaft 770 may comprise multiple components or pieces.

Output shaft 770 and collective control assemblies 264 are in mechanical communication such that movement of grip (730) results in movement of output shaft 770, and movement of output shaft 770 likewise results in movement of grip (730). Movement of output shaft 770 may be measured or otherwise determined by position measurement devices 750. Measurements from measurement devices 750 may be used to instruct rotor system 110, e.g., as to how to change the position of main rotor blades 120.

Collective trim assembly 350 may operate in three modes of operation. In a first mode of operation, variable friction devices 720 are engaged and trim motor 710 drives output shaft 770. This first mode of operation may represent, for example, operation of collective trim assembly 350 during auto-pilot operations. In this example, trim motor 710 may drive movement of output shaft 770 so as to drive movement of grip (730) of collective control assembly 264. Position measurement devices 750 may also measure how trim motor 710 drives output shaft 770 and communicate these measurements to rotor system 110.

In a second mode of operation, variable friction devices 720 are disengaged and the pilot drives output shaft 770 by way of collective control assembly 264. In this example, the pilot changes the position of output shaft 770, which may be measured or otherwise determined by position measurement devices 750. Position measurement devices 750 may measure or otherwise determine how the pilot drives output shaft 770 and communicate these measurements to rotor system 110.

In a third mode of operation, variable friction devices 720 are engaged, and trim motor 710 holds its output arm at a trim position so as to provide a ground point for output shaft 770. In this example, the pilot may change the position of output shaft 770 about the trim position set by trim motor 710. When the pilot releases grip (730), grip (730) may move to the trim position corresponding to the position established by trim motor 710. In some embodiments, the first and third modes of operations may be combined such that trim motor 710 moves the trim position during operation.

Thus, trim motor 710 may provide collective force or trim to collective control assembly 264 through output shaft 770. In one example embodiment, trim motor 710 may be a 28 volt DC permanent magnet motor. In operation, trim motor 710 may provide an artificial force feel for an FCS about an anchor point. Variable friction devices 720 provide a mechanism for engaging and disengaging trim motor 710.

FIG. 8 shows an embodiment of anti-torque trim assembly 500 featuring a gradient spring 840, a damper 850, a shear device 860, position measurement devices 870, mechanical stop devices 880, and an output shaft 890. Although output shaft 890 may be described as a single shaft, it will be appreciated that output shaft 890 may comprise multiple pieces or components.

In operation, according to an embodiment, output shaft 890 and pedal assemblies 266 are in mechanical communication such that movement of the pedals results in movement of output shaft 890, and movement of output shaft 890 likewise results in movement of the pedals. Movement of output shaft 890 may be measured or otherwise determined by position measurement devices 870. Measurements from measurement devices 870 may be used to instruct rotor system 110, e.g., as to how to change the position of tail rotor blades 120' (or how to change operation of an alternative anti-torque system).

Although cyclic control assembly 262, collective control assembly 264, and pedal assemblies 266 may generally control the cyclic, collective, and anti-torque movements of rotorcraft 100 (respectively), generally, aircraft dynamics may result in a coupling of aircraft motions (or flight characteristics). As an example, inputting a change in lateral cyclic into cyclic control assembly 262 may result in a change in the pitch moment of rotorcraft 100. This change in the pitch moment may occur even if no longitudinal cyclic input is provided to cyclic control assembly 262. Rather, this change in the pitch moment would be the result of aircraft dynamics. In such an example, a pilot may apply a counteracting longitudinal cyclic input to compensate for the change in pitch moment. Accordingly, coupling of aircraft flight characteristics generally increases pilot workload.

Different aircrafts may be associated with different couplings of aircraft motions. For example, a rotorcraft with a canted tail rotor may be associated with a high level of coupling due to the "lift" generated by the canted tail rotor combined with normal coupling of yaw motion to collective pitch and coupling of cyclic inputs of conventional single-rotor rotorcraft. In such an example, feedback loops may not be sufficient to compensate for this coupling because feedback loops do not engage until after the coupled response occurs.

Figure 9:
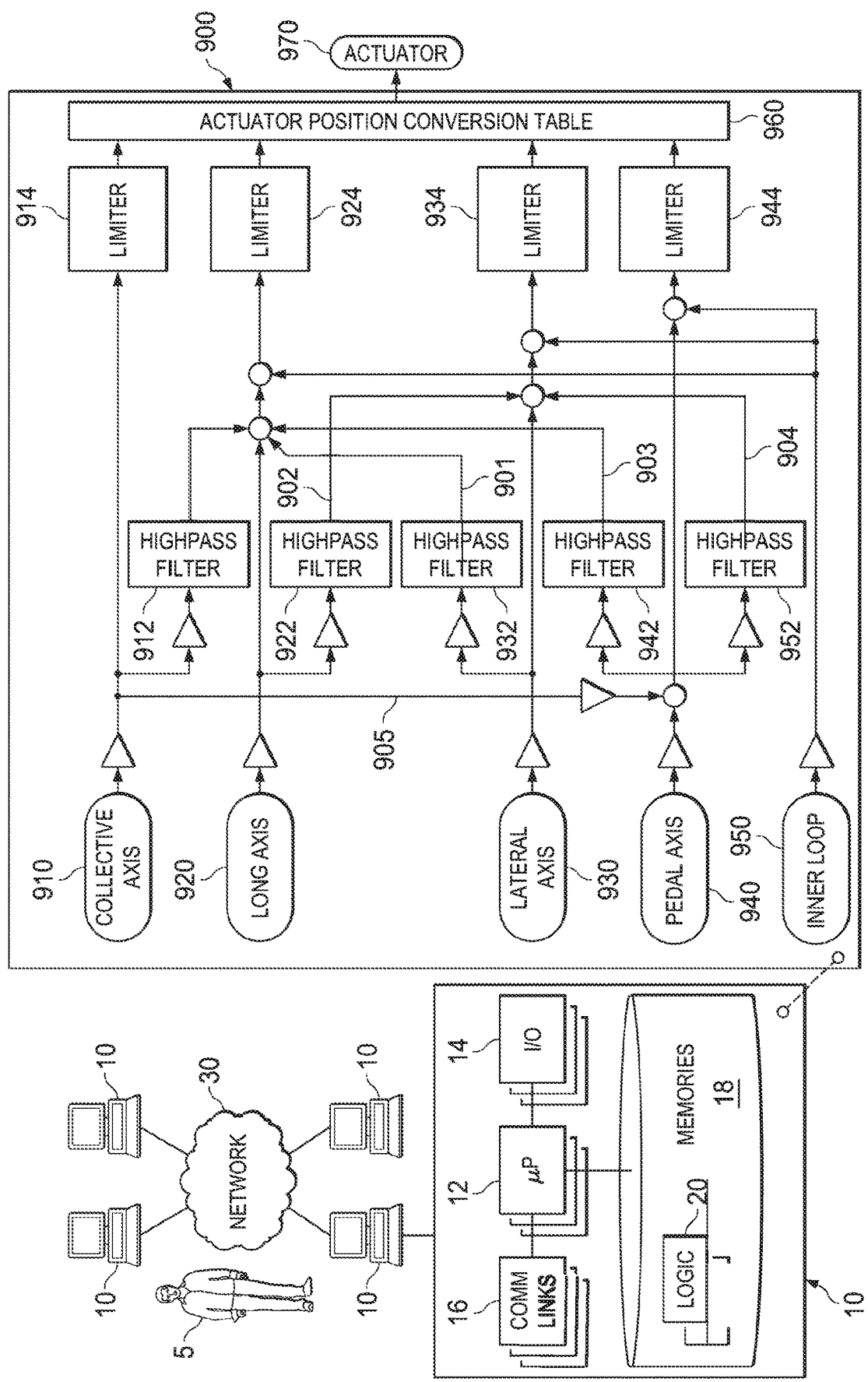
FIG. 9 representatively illustrates a cross-feed arrangement in accordance with and embodiment.

Accordingly, rotorcraft fly-by-wire systems described herein recognize the capability to augment flight control commands with feed-forward control cross-feeds that anticipate inherent coupling of aircraft motions. FIG. 9 shows a fly-by-wire cross-feed arrangement 900. As shown in FIG. 9, cross-feed arrangement 900 has five inputs: collective axis input 910, longitudinal cyclic axis input 920, lateral cyclic axis input 930, pedal axis input 940, and inner loop input 950. Examples of inner loop input 950 will be discussed later with regard to FIG. 10.

As representatively illustrated in FIG. 9, each input may be cross-fed to a different axis. In some examples, high-pass filters (e.g., high-pass filters 912, 922, 932, 942, and 952) may be used to filter cross-feed signals by allowing high-frequency signals to pass, but attenuating frequencies lower than a cut-off frequency. Fixed gains are applied to the inputs before passing through the high-pass filters. The cross-feed signals may then be passed through a limiter (e.g., limiter 914, 924, 934, or 944) to an actuator position converter 960, which processes the signals and converts them into instructions for one or more actuators 970. Each actuator 970 may represent any device that provides flight control inputs to a flight control device. Examples of actuators 970 may include, but are not limited to, a swashplate actuator, a pitch-link actuator, an on-blade actuator, or the like.

The example of FIG. 9 has at least five representative cross-feeds. A first cross-feed 901 is a lateral cyclic to longitudinal cyclic cross-feed based on providing longitudinal cyclic to cancel the pitch moment generated by a change in lateral cyclic. A second cross-feed 902 is a longitudinal cyclic to lateral cyclic cross-feed based on providing lateral cyclic to cancel the roll moment generated by a change in longitudinal cyclic. A third cross-feed 903 is a pedal axis (tail rotor collective) to longitudinal cyclic cross-feed based on providing longitudinal cyclic to cancel the pitch moment of the tail rotor collective. A fourth cross-feed 904 is a tail rotor collective to lateral cyclic cross-feed based on providing lateral cyclic to cancel the roll moment of the tail rotor collective. A fifth cross-feed 905 is a main rotor collective to tail rotor collective cross-feed based on providing tail rotor collective to cancel the yaw moment of the main rotor collective.

Although FIG. 9 is representatively illustrated with five cross-feeds, more, fewer, or different cross-feeds may be utilized. In general, cross-feeds may be utilized whenever a pilot provides a command to change a first flight characteristic, where changing the first flight characteristic would result in an expected change to a second flight characteristic. The cross-feed may result in an instruction to change a first operating condition of the FCS in response to a received pilot command and an instruction to change a second operating condition in response to the expected change to the second flight characteristic. This second instruction could at least partially offset, counteract, or otherwise address the expected change to the second flight characteristic.

Representative embodiments appreciate that applying cross-feeds to "decouple" an aircraft having coupled flight dynamics may reduce pilot workload by automatically applying cross-feed commands without pilot intervention. For example, in some embodiments, applying decoupling cross-feeds may reduce or eliminate the need for the pilot to apply commands through the pilot controls that are intended to at least partially offset the coupled motion of the aircraft. In some circumstances, the FCS may apply cross-feed inputs faster than a pilot could manually. For example, the cross-feeds may anticipate (and therefore more quickly address) inherently coupled aircraft motions or flight characteristics.

Cyclic control assembly 262 may be configured to operate as a displacement-trim device such that movements of the longitudinal stick correlate to the position of the swashplate. In such an example, applying cross-feeds to anticipate inherent coupling of aircraft motions may result in the stick position failing to accurately represent a position of the swashplate, unless or until the trim motor back-drives the pilot control device to match the swashplate position. Continuously driving the stick, especially at high frequency due to aircraft dynamics, however, may increase workload of the pilot trim system and may increase pilot fatigue by transferring transient motions of the swashplate to the pilot's hand and forcing the pilot's hand to follow the stick as the swashplate moves.

Accordingly, teachings of certain embodiments recognize capabilities to wash out cross-feeds over a short period of time such that a displacement-trim flight control device substantially reflects the position of the swashplate during steady-state flight, but does not reflect the position of the swashplate during short transient periods. For example, the trim motor may drive the stick in certain conditions (e.g., during auto-pilot controlled flight or establishing a new trim position), but the FCC may be configured to not command the trim motor to move the pilot control stick in response to application of the cross-feed. In some embodiments, the FCC may be configured to command the motor to move the pilot control stick based on positions of the swashplate during steady-state conditions, and may be configured to not command the motor to move the pilot control stick during transitory conditions.

The wash out time period may be less than about ten seconds (e.g., about 2-7 seconds). In some embodiments, a wash out time period begins when the cross-feed is first applied. In other embodiments, a wash out time period begins after the aircraft returns to steady-state. In some embodiments, the aircraft returns to a same steady-state condition as existing before the cross-feed was applied. In other embodiments, a new steady-state condition may be established after the cross-feed is applied.

Elements of cross-feed arrangement 900 may be implemented at least partially by one or more computer systems 10. All, some, or none of the components of cross-feed arrangement 900 may be located on or near an aircraft, such as rotorcraft 100.

Users 5 may access cross-feed arrangement 900 through computer systems 10. For example, in some embodiments, users 5 may provide flight control inputs that may be processed using a computer system 10. Users 5 may include any individual, group of individuals, entity, machine, or mechanism that interacts with computer systems 10. Examples of users 5 include, but are not limited to, a pilot, a copilot, a service person, an engineer, a technician, a contractor, an agent, an employee, or the like. Users 5 may be associated with an organization. An organization may include any social arrangement that pursues collective goals. One example of an organization is a business. A business is an organization designed to provide goods or services, or both, to consumers, governmental entities, or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although representatively illustrated embodiments depict one example of computer system 10 that may be used, other embodiments may utilize computers other than computer system 10. Additionally, other embodiments may employ multiple computer systems 10 or other computers networked together in one or more public or private computer networks, such as one or more networks 30.

Processors 12 represent devices operable to execute logic contained within a computer-readable medium. Examples of processor 12 include one or more microprocessors, one or more applications, or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, a keyboard, a display, a printer, or the like.

Network interfaces 16 may be operable to facilitate communication between computer system 10 and another element of a network, such as other computer systems 10. Network interfaces 16 may connect to any number or combination of wireline or wireless networks suitable for data transmission, including transmission of communications.

Memory 18 represents any suitable storage mechanism and may store any data for use by computer system 10. Memory 18 may comprise one or more tangible, computer-readable, or computer-executable storage medium.

In some embodiments, memory 18 stores logic 20. Logic facilitates operation of computer system 10. Logic 20 may include hardware, software, or other logic. Logic 20 may be encoded in one or more tangible, non-transitory media and may perform operations when executed by a computer. Logic 20 may include a computer program, software, computer executable instructions, or instructions capable of being executed by computer system 10.

Various communications between computers 10 or components of computers 10 may occur across a network, such as network 30. Network 30 may represent any number and combination of networks suitable for data transmission. Network 30 may, for example, communicate internet protocol packets, frame relay frames, asynchronous transfer mode cells, or other suitable data between network addresses. Although representatively illustrated embodiments show one network 30, other embodiments may include more or fewer networks. Not all elements comprising various network embodiments may communicate via a network. Representative aspects and implementations will appreciate that communications over a network is one example of a mechanism for communicating between parties, and that any suitable mechanism may be used.

FIG. 10 representatively illustrates a three-loop FCS 1000 according to an embodiment. Like the cross-feed arrangement 900 of FIG. 9, elements of three-loop FCS 1000 may be implemented at least partially by one or more computer systems 10. All, some, or none of the components of three-loop FCS 1000 may be located on or near an aircraft such as rotorcraft 100.

The three-loop FCS 1000 of FIG. 10 has a pilot input 1010, an outer loop 1020, a rate (middle) loop 1030, an inner loop 1040, a decoupler 1050, and aircraft equipment 1060. Examples of inner loop 1040 and decoupler 1050 may include, but are not limited to, cross-feed arrangement 900 and inner loop 950 of FIG. 9. Representative examples of aircraft equipment 1060 may include, but are not limited to, actuator position converter 960 and actuators 970 of FIG. 9.

In the example of FIG. 10, a three-loop design separates the inner stabilization and rate feedback loops from outer guidance and tracking loops. The control law structure primarily assigns the overall stabilization task to inner loop 1040. Next, middle loop 1030 provides rate augmentation. Outer loop 1020 focuses on guidance and tracking tasks. Since inner loop 1040 and rate loop 1030 provide most of the stabilization, less control effort is required at the outer loop level. As representatively illustrated in FIG. 10, switch 1025 is provided to turn third-loop flight augmentation on and off.

In some embodiments, the inner loop and rate loop include a set of gains and filters applied to roll/pitch/yaw 3-axis rate gyro and acceleration feedback sensors. Both the inner loop and rate loop may stay active, independent of various outer loop hold modes. Outer loop 1020 may include cascaded layers of loops, including an attitude loop, a speed loop, a position loop, a vertical speed loop, an altitude loop, and a heading loop.

The sum of inner loop 1040, rate loop 1030, and outer loop 1020 are applied to decoupler 1050. Decoupler 1050 approximately decouples the 4-axes (pitch, roll, yaw, and vertical) such that, for example, the forward longitudinal stick input does not require the pilot to push the stick diagonally. Similarly, as collective pull increases torque and results in an increased anti-torque requirement, decoupler 1050 may provide both the necessary pedal and a portion of cyclic (e.g., if rotorcraft 100 has a canted tail rotor) to counter increased torque.

In accordance with a representative embodiment, decoupling of plural flight characteristics allows for a control-law-automated, -mediated, or at least-assisted change in roll angle and collective pitch to, e.g., perform a go-around maneuver. The term "go-around" arises from traditional use of traffic patterns at airfields. A landing aircraft may first join a circuit pattern and prepare for landing in an orderly fashion. If, for some reason, the pilot decides not to land, the pilot can fly back up to circuit height and complete another circuit. The term go-around is used even when aircraft do not use traditional circuit patterns for landing.

A go-around does not in itself constitute any sort of emergency; although it could be performed in response to an emergency. Many airlines and aircraft operators state a list of conditions that must be satisfied so that a safe landing can be carried out. If one or more of these conditions cannot be satisfied, then a go-around may be considered in some cases and must be carried out in others. This list is typically written in the operations manual which is approved by relevant aviation authorities (e.g., CAA in the UK, FAA in the United States). The operator's list of conditions is not exhaustive, and pilots generally use their individual judgment outside of this scope.

In manual application, a go-around maneuver may include: applying power, adopting an appropriate climb attitude and airspeed, checking for a positive rate of climb, raising landing gear if the aircraft has retractable gear, positioning to the deadside of the runway, climbing to pattern altitude, and advising the control tower or other traffic of the go-around.

As representatively illustrated in FIG. 11, FIG. 12, FIG. 13, and FIG. 14, a rotorcraft fly-by-wire control law system in accordance with various representative aspects may be used to place rotorcraft 100 in a roll-neutral attitude, in a state of increasing altitude, and with adjusted or otherwise controlled forward velocity (e.g., attending performance of an at least partially automated go-around maneuver).

Figure 11:
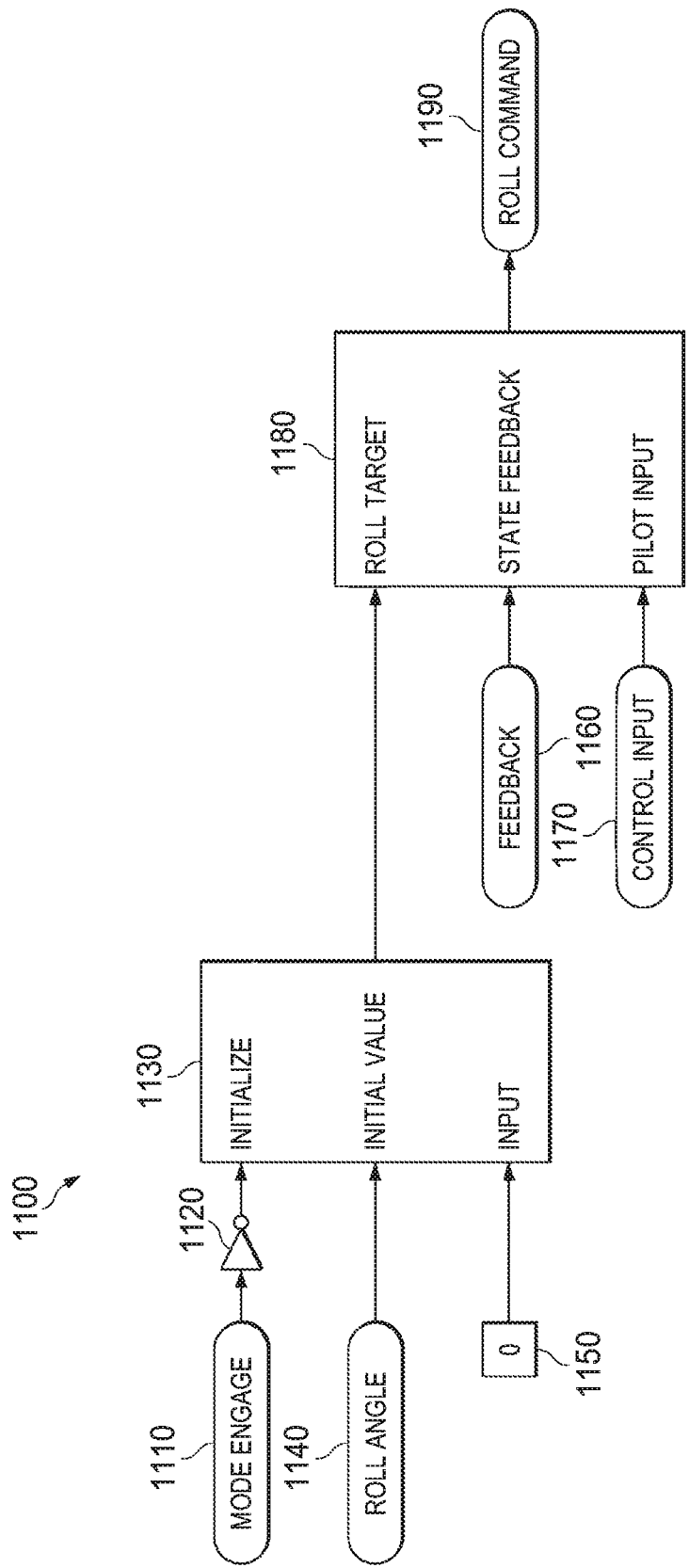
FIG. 11 representatively illustrates logic for transitioning to a roll-neutral attitude in accordance with an embodiment.

In an embodiment as representatively illustrated in FIG. 11, the FCC and FCS may be configured to engage a roll component 1100 of a go-around maneuver based on input received from the PCA in correspondence to bringing wings level (establishing a neutral roll attitude). For example, in any initial roll attitude of rotorcraft 100, the pilot may select go-around button 404 to indicate that a go-around maneuver is to be performed. In accordance with the preceding, the pilot depresses go-around button 404. Pilot manipulation of go-around button 404 produces mode engagement input 1110. Logical not 1120 operates on mode engagement input 1110 to provide initialization signal to lag filter 1130. Roll angle sensor data 1140 is provided to lag filter 1130 indicating roll attitude of rotorcraft 100. Zero value 1150 is provided to lag filter 1130 indicating desired roll attitude for the maneuver (i.e., 0=wings level, neutral roll attitude). Inner loop control 1180 receives roll target value from lag filter 1130, as well as feedback 1160 and pilot control input 1170, and to output roll command 1190. In representative implementations, lag filter 1130 provides a smooth transition from an initial roll attitude of rotorcraft 100 to a neutral roll attitude. In accordance with a representative aspect, control laws are implemented to alter the roll attitude of rotorcraft 100 and transition rotorcraft from sensed roll angle 1140 to wings level (1150) as a component of the requested maneuver. In other representative aspects, control laws may be implemented to diminish or otherwise zero lateral velocity (e.g., in hover or slow flight), to adjust roll axis to hold a heading, to diminish or otherwise zero yaw rate, or the like.

Figure 12:
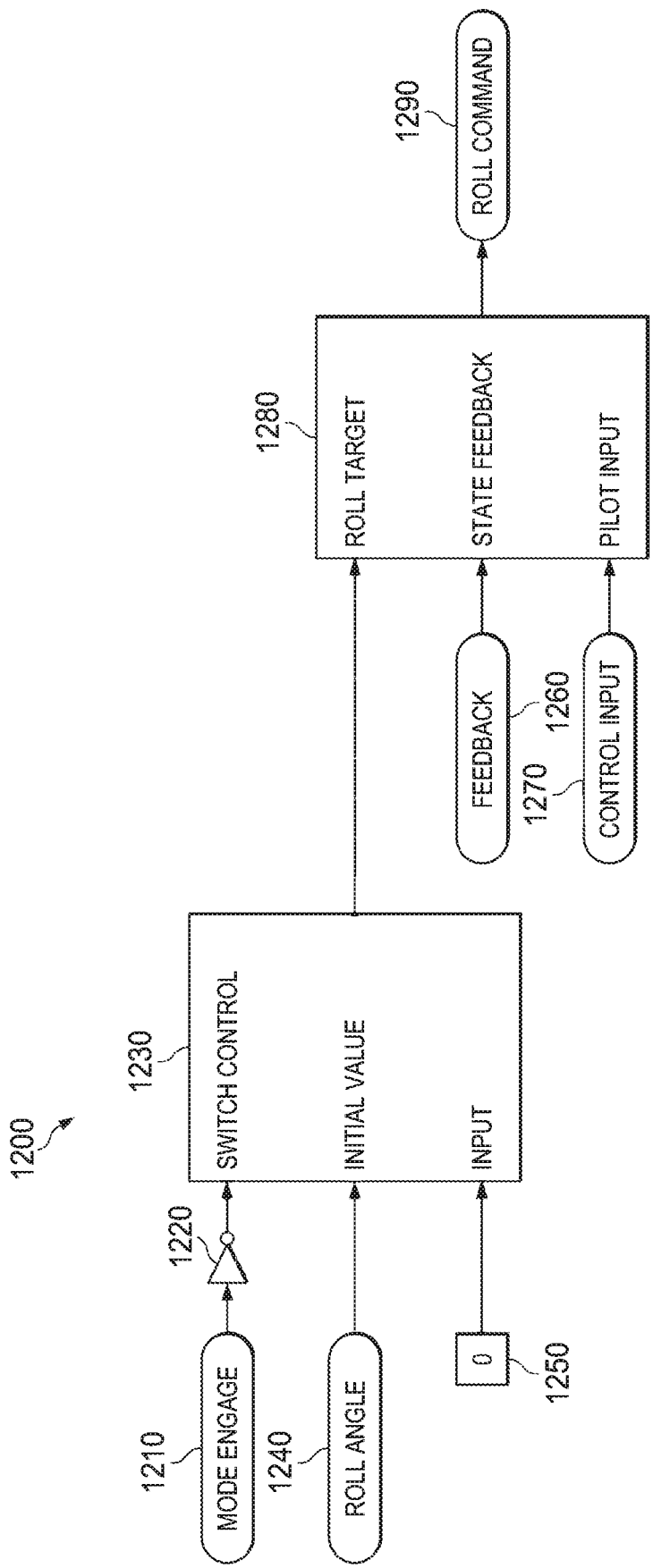
FIG. 12 representatively illustrates logic for transitioning to a roll-neutral attitude in accordance with another embodiment.

In another embodiment as representatively illustrated in FIG. 12, the FCC and FCS may be configured to engage a roll component 1200 of a go-around maneuver based on input received from the PCA in correspondence to bringing wings level (establishing a neutral roll attitude). For example, in any initial roll attitude of rotorcraft 100, the pilot may select go-around button 404 to indicate that a go-around maneuver is to be performed. In accordance with the preceding, the pilot depresses go-around button 404. Pilot manipulation of go-around button 404 produces mode engagement input 1210. Logical not 1220 operates on mode engagement input 1210 to provide initialization signal to fader switch 1230. Roll angle sensor data 1240 is provided to fader switch 1230 indicating sensed roll attitude of rotorcraft 100. Zero value 1250 is provided to fader switch 1230 indicating desired roll attitude for the go-around maneuver (i.e., 0=wings level, neutral roll attitude). Inner loop control 1280 receives roll target value from fader switch 1230, as well as feedback 1260 and pilot control input 1270, and outputs roll command 1290. Fader switch 1230 may be configured (e.g., with a linear ramp over a specified time) to provide a smooth transition from an initial roll attitude of rotorcraft 100 to wings level. In accordance with other representative embodiments, a rate limiter may be used to provide a fixed rate of change in roll attitude instead of transitioning to neutral roll attitude over a fixed time. In accordance with a representative aspect, control laws are implemented to alter the roll attitude of rotorcraft 100 and transition rotorcraft from sensed roll angle 1240 to wings level (1250) as a component of the requested maneuver.

Although various representative embodiments described herein discuss pilot manipulation of "go-around" button 404, it will be appreciated that any switch, button, or other engagement mechanism of PCA may be alternatively, conjunctively, or sequentially employed to engage a roll-to-neutral, elevation-climb maneuver. It will be further appreciated that such maneuver may or may not correspond to a pilot's intention to perform a "go-around" maneuver, but may alternatively service other purposes intended by the pilot. For example, the pilot may desire to bring rotorcraft 100 into a wings level orientation (e.g., to recover from an unusual attitude).

In accordance with representative aspects, a smooth transition to a roll-neutral attitude may be desirable to maximize or otherwise optimize performance for a subsequent or concurrent climb in altitude. The roll-neutral component of the maneuver may also provide a benefit of allowing the pilot to engage a control laws -automated, -mediated, or at least -assisted recovery from any roll attitude of rotorcraft 100 without the pilot having to interrupt physical contact with the primary controls (e.g., collective control and cyclic control). For example, rotorcraft 100 may be in an unusual roll attitude attendant the pilot losing a visual reference, being distracted, or experiencing spatial disorientation. In such circumstances, the pilot may engage go-around button 404 to benefit from the component aspect of the engaged go-around maneuver corresponding to returning rotorcraft 100 to a roll-neutral orientation.

Figure 13:
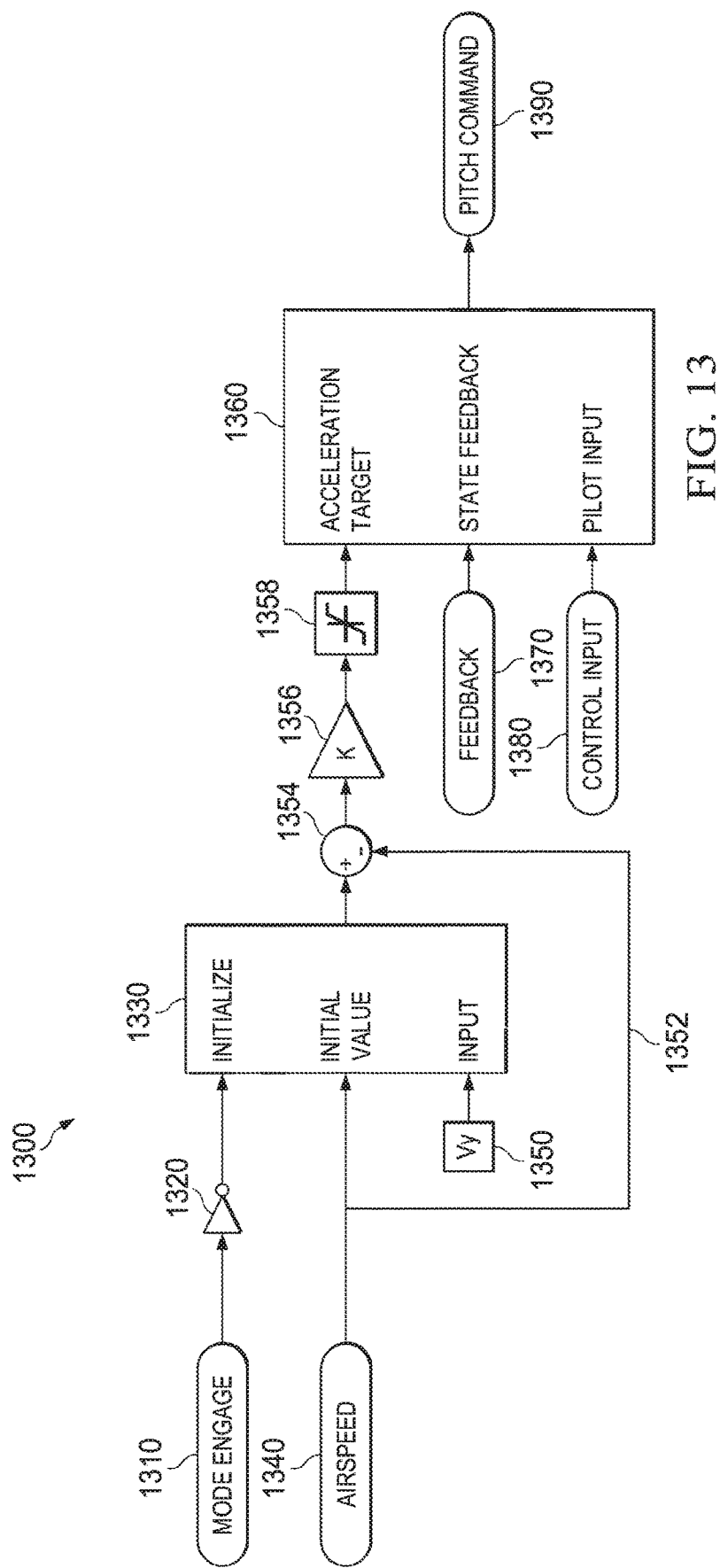
FIG. 13 representatively illustrates logic for increasing or decreasing forward velocity in accordance with an embodiment.

In an embodiment as representatively illustrated in FIG. 13, the FCC and FCS may be configured to engage a forward velocity component 1300 of a go-around maneuver based on input received from the PCA to bring rotorcraft 100 to wings level and initiate a climb in altitude. For example, the pilot may select go-around button 404 to indicate that a go-around maneuver is to be performed. In accordance with the preceding, the pilot depresses go-around button 404. Pilot manipulation of go-around button 404 produces mode engagement input 1310. Logical not 1220 operates on mode engagement input 1310 to provide initialization signal to fader switch 1330. Airspeed sensor data 1340 is provided to fader switch 1330 indicating sensed forward velocity of rotorcraft 100. Vy value 1350 is provided to fader switch 1330 indicating a desired forward velocity for the maneuver (e.g., a desired forward airspeed corresponding to an optimized or otherwise improved rate of climb). Comparator 1354 determines a vector difference between airspeed data 1352 bridging fader switch 1330 and the desired forward velocity output of fader switch 1330. For example, the absolute value (or magnitude) of the difference between sensed airspeed 1340 and desired forward velocity is determined, as well as the sign (or direction) of the difference (e.g., positive indicating acceleration to achieve the desired forward velocity, negative indicating deceleration to achieve the desired forward velocity). Output of comparator 1354 is provided to gain stage 1356, where K indicates a desired acceleration or deceleration. Output from gain stage 1356 is provided to rate limiter 1358 to provide an acceptable range of acceleration/deceleration. Output from rate limiter 1358 is provided to inner loop control 1360 as an acceleration target (positive or negative) for bringing sensed airspeed 1340 to the desired forward velocity (1350). Inner loop control 1360 also receives feedback 1370 and pilot control input 1380, and outputs roll command 1390. Accordingly, fader switch 1330 may be configured to provide a rate-limited, smooth transition of rotorcraft 100 from an initial forward velocity to a desired forward velocity attending performance of the requested maneuver. In accordance with a representative aspect, control laws are implemented to alter the pitch of rotorcraft 100 to transition rotorcraft from sensed airspeed 1340 to a desired forward velocity (1350) as a component of the requested maneuver. In accordance with another representative aspect, control laws provide a longitudinal acceleration command configured to blend into speed control without need for switching. In accordance with yet another representative aspect, engagement of the go-around maneuver may be configured to establish a pitch-neutral orientation or return-to-level-flight function of rotorcraft 100 at engagement (e.g., to provide zero longitudinal acceleration, to recover from an unusual pitch attitude, or the like).

Figure 14:
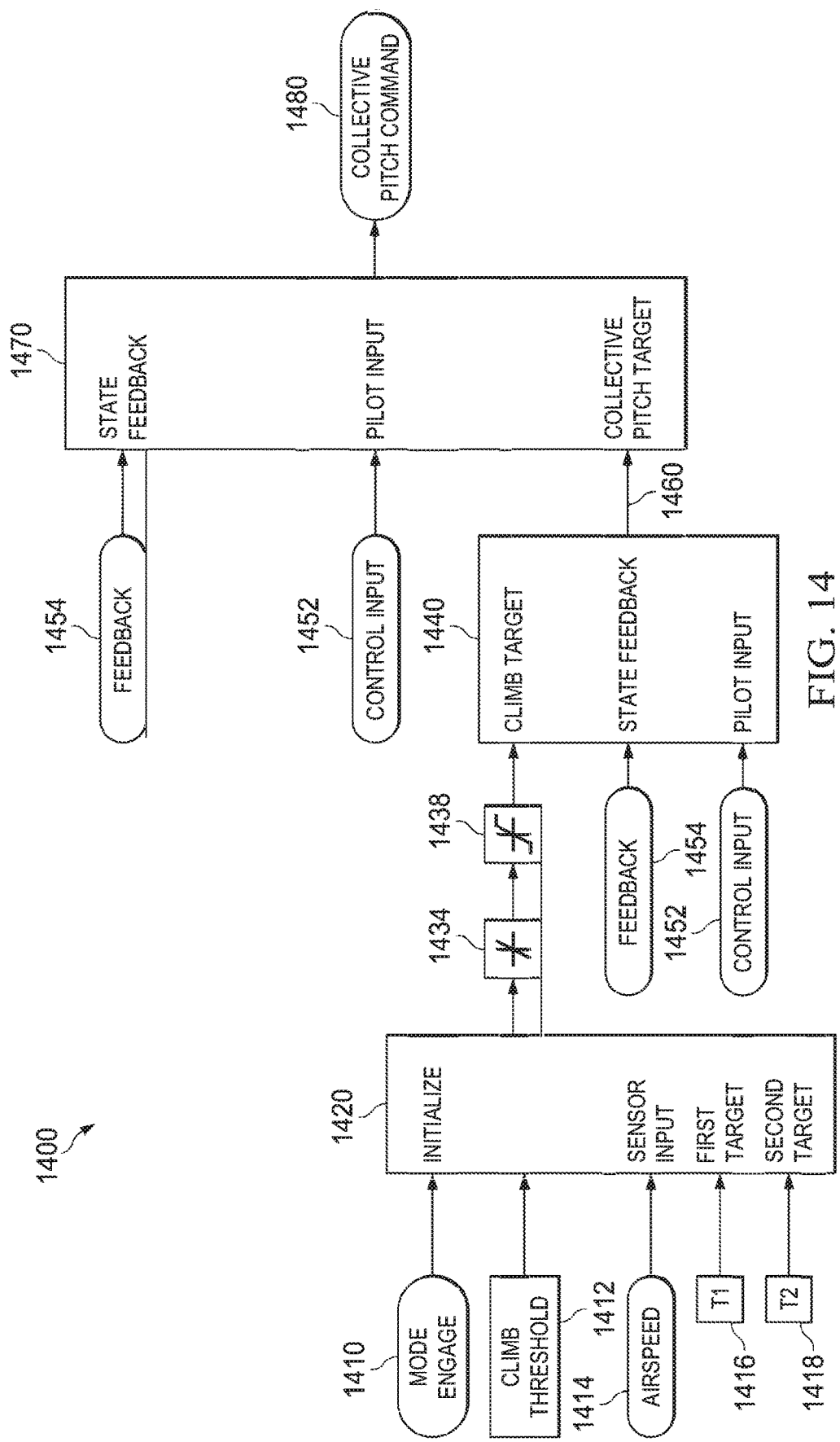
FIG. 14 representatively illustrates logic for increasing altitude in accordance with an embodiment.

In an embodiment as representatively illustrated in FIG. 14, the FCC and FCS may be configured to engage an altitude climb component 1400 of a go-around maneuver based on input received from the PCA to bring rotorcraft 100 to wings level and initiate a climb in altitude. For example, the pilot may select go-around button 404 to indicate that a go-around maneuver is to be performed. In accordance with the preceding, the pilot depresses go-around button 404. Pilot manipulation of go-around button 404 produces mode engagement input 1410 to climb target selector 1420. Climb target selector 1420 determines a desired climb rate target based on rotorcraft 100 state. In a representative embodiment, climb target selector 1420 is configured to select between multiple climb rate targets (e.g., first target 1416, 1418) based on climb threshold 1412 and forward airspeed. Airspeed sensor data 1414 is provided to climb target selector 1420 indicating sensed forward velocity of rotorcraft 100. In an alternative embodiment, climb target selector 1420 may be configured to provide a climb rate target as a substantially continuous function of airspeed (e.g., within limits).

In representative implementations, climb target selector 1420 may be configured with initialization logic to ensure smooth transition from an initial forward airspeed to a desired forward airspeed climb target. Climb target selector 1420 may also be configured to ensure rotorcraft 100 will not lower the climb rate in order to reach a forward velocity target. If airspeed at engagement is greater than about 45 knots, climb target selector 1420 may be configured to provide adequate power to climb (e.g., at a rate of about 750 fpm) and accelerate forward. If airspeed is below 45, climb target selector 1420 may be configured to hold the higher of a current climb rate or 250 fpm until forward airspeed is greater than about 45 knots. In a representative implementation, climb target selector 1420 may be further configured to provide adequate power for rotorcraft 100 to accelerate to about 75 knots. In another representative implementation, climb target selector 1420 may be configured to prevent or otherwise avoid an initial vertical climb at too rapid a rate. If rotorcraft 100 has a forward velocity of less than about 45 knots and is climbing between about 250 fpm and about 750 fpm, the FCC may be configured to hold a current velocity, rather than decreasing power to slow the rate of climb.

Output of climb target selector 1420 is provided to rate limiter 1434 and magnitude limiter 1438 to provide an acceptable range of acceleration. Output from limiters 1434, 1438 is provided to inner loop control 1440 as a climb target. Inner loop control 1440 also receives feedback 1454 and pilot control input 1452. Accordingly, climb target selector 1420 may be configured to provide a rate-/magnitude-limited, smooth transition of rotorcraft 100 from an initial altitude to a desired altitude at a desired vertical velocity attending performance of the requested maneuver. In accordance with a representative aspect, control laws are implemented to alter the collective pitch of rotor system 110 to transition rotorcraft 100 from a first vertical velocity to a desired vertical velocity (1460) as a component of the requested maneuver. In accordance with another representative aspect, control laws provide a vertical acceleration command 1480 configured to engage an ascent in altitude. In accordance with yet another representative aspect, engagement of the go-around maneuver may be configured to provide vertical acceleration and forward acceleration.

Figure 15:
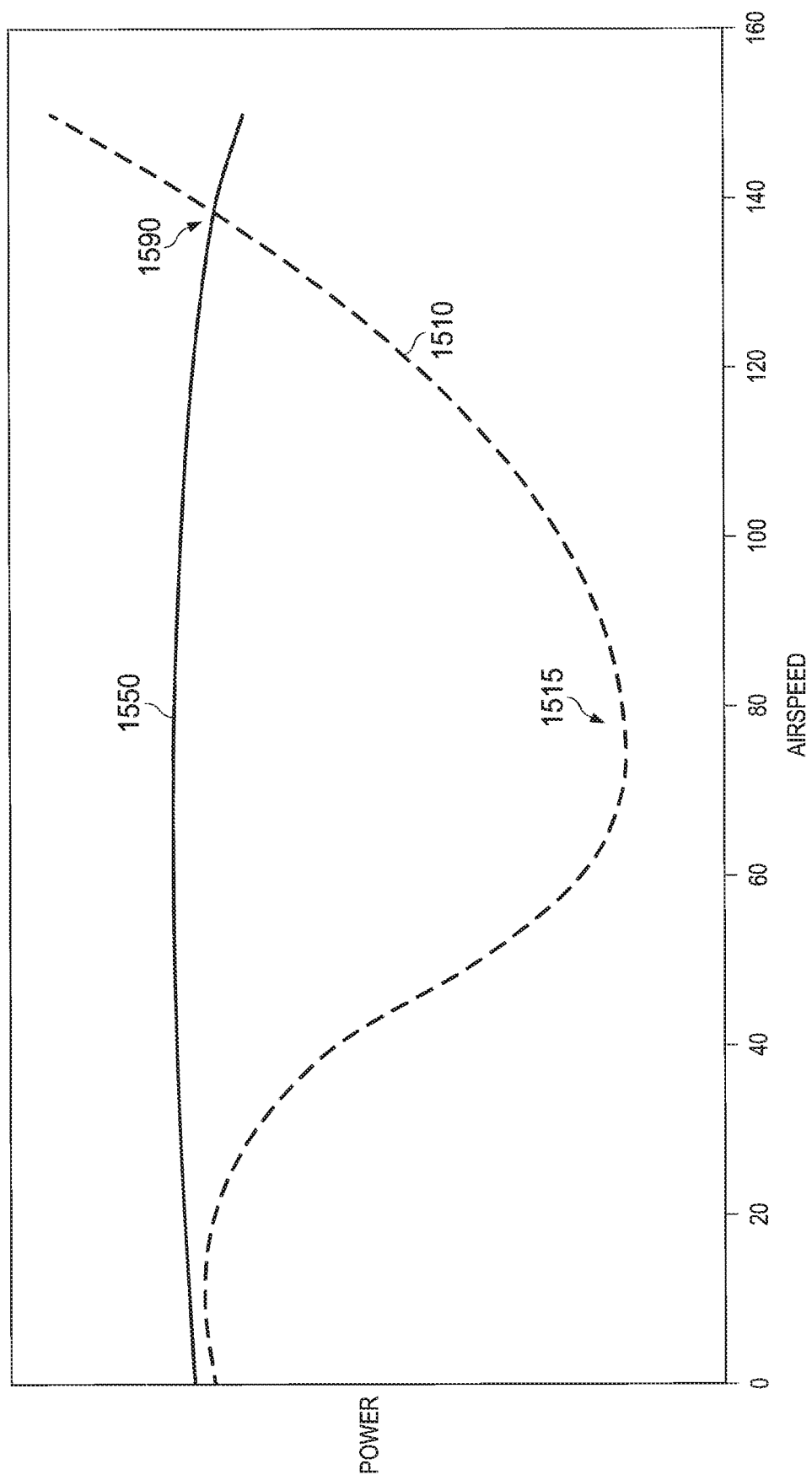
FIG. 15 representatively illustrates power curves as functions of airspeed in accordance with an embodiment.

In an embodiment, vertical acceleration command 1480 may be provided to adaptive command limiter 1470 to prevent collective power from being lowered in high-energy conditions. For example, as representatively illustrated in FIG. 15, required power 1510 (e.g., for steady flight condition) is a function of forward airspeed with a minimum value at Vy 1515, where Vy 1515 corresponds to an optimal climb velocity. Available power 1550 represents excess power available for increasing the climb rate. At higher airspeeds (e.g. at 1590), rotorcraft 100 can transiently enter a higher rate climb ("zoom climb") than available power 1550 can sustain. If this causes the climb rate to exceed about 750 fpm, the system may respond by lowering collective pitch, causing the climb rate to drop below target as forward airspeed bleeds off. Available power 1510 can also be used to accelerate aircraft. At low speed (e.g., about 40 knots in unaccelerated flight), aircraft may have enough power to climb at a rate of about 900 fpm. Under these circumstances, the FCC would lower collective pitch to achieve a climb rate of about 750 fpm; however, pitching rotorcraft 100 forward to accelerate results in a condition where a sustainable climb rate may decrease to about 500 fpm at lower collective pitch. The FCC then reverses direction to recover climb performance. Accordingly, adaptive command limiter 1470 may be configured to prevent the system from lowering collective pitch until forward airspeed is stabilized when the climb rate is above a target climb rate. In a representative aspect, this may operate to prevent or otherwise reduce premature power loss during a zoom climb, or when pitching forward to accelerate to Vy 1515.

In accordance with various representative embodiments, forward airspeed may be determined as indicated airspeed ("IAS"), calibrated airspeed ("CAS"), true airspeed ("TAS"), equivalent airspeed ("EAS"), or density airspeed, and any combination of groundspeed or airspeed sensor data may be used to provide a blended airspeed value.

Go-around maneuver may be engaged for any component aspect or feature of the maneuver (e.g., to bring to wings level, to engage an automated rate of climb, to engage an automated control of forward velocity, or the like). Component aspects or features of a requested go-around maneuver may be simultaneously engaged, concurrently engaged, or sequentially engaged.

As with engagement of a roll-to-neutral, elevation-climb maneuver with go-around button 404, it will be likewise appreciated that any switch, button, or other mechanism of PCA may be alternatively, conjunctively, or sequentially employed to disengage the maneuver. For example, a button of cyclic control assembly 262 may be selected to disengage the maneuver. In response to requested disengagement, transition to wings level and increasing altitude may be washed out over a period of time (e.g., less than about 10 seconds, less than about 7 seconds, less than about 5 seconds, less than about 2 seconds, between about 2 seconds and about 7 seconds, or the like).

Figure 16:
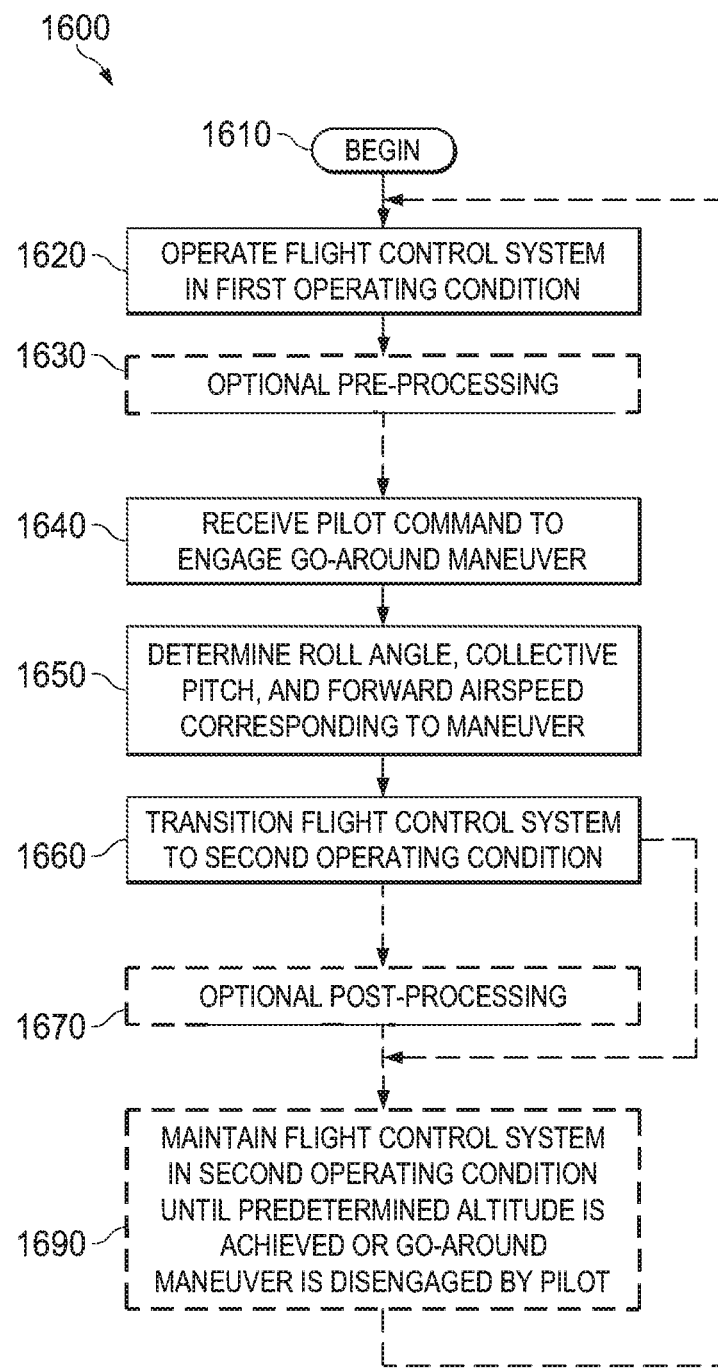
FIG. 16 representatively illustrates a fly-by-wire method for performing a maneuver in accordance with an embodiment.

In accordance with an embodiment as representatively illustrated in FIG. 16, a method 1600 for implementing an automated, mediated, or assisted go-around maneuver in control laws begins 1610 with a step 1620 of operating the FCS of rotorcraft 100 in a first operating condition. The first operating condition may be any condition of operating the FCS. For example, the first operating condition may correspond to rotorcraft 100 engaged in forward descending flight in a non-zero roll attitude. Step 1630 represents optional pre-processing that the FCC may engage (or be engaged in) preliminary to the FCC receiving a pilot command to perform a go-around maneuver in step 1640. For example, optional pre-processing 1630 may comprise control laws performing various transient adjustments during operation of rotorcraft 100 in the first operating condition 1620. After a pilot command is received in step 1640 to engage a go-around maneuver, the FCC determines in step 1650, roll angle, collective pitch, and forward airspeed for implementation in performance of the requested maneuver (e.g., a go-around maneuver bringing wings level, increasing altitude, and maintaining, increasing, or decreasing forward velocity). Thereafter the FCS is transitioned to a second operating condition in step 1660—e.g., the second operating condition corresponding to bringing wings level, increasing altitude, and maintaining, increasing, or decreasing forward velocity of rotorcraft 100. Thereafter, FCC may engage optional post-processing in step 1670. For example, optional post-processing 1670 may comprise control laws performing various automated adjustment in response to transient conditions to which rotorcraft 100 may be subject (e.g., wind gusts, or the like). In step 1690, the second operating condition is maintained until a predetermined altitude is achieved or until the go-around maneuver is disengaged by the pilot. If the pilot disengages the maneuver, the FCS may optionally be returned to the first operating condition or any other operating condition of the FCS.

Figure 17:
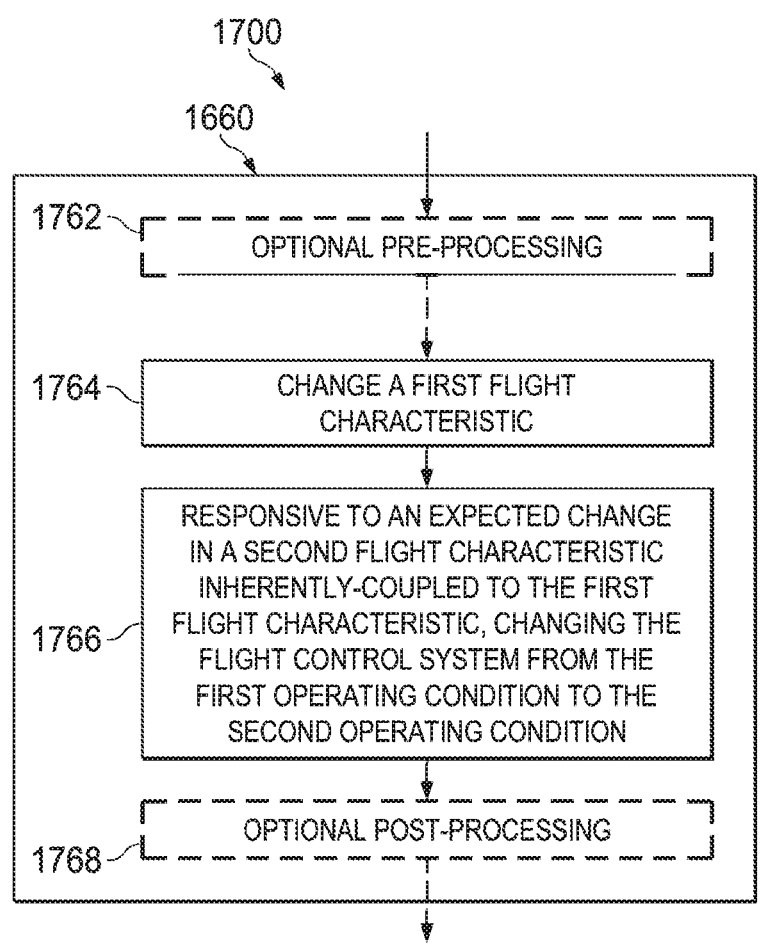
FIG. 17 representatively illustrates a fly-by-wire method for transitioning to a roll-neutral climb in accordance with an embodiment.

In accordance with an embodiment as representatively illustrated in FIG. 17, in an exemplary method 1700, step 1660 (see also FIG. 16) of transitioning the FCS to a second operating condition includes a step of optional pre-processing 1762. Optional pre-processing 1762 may include the same or similar, or different, elements as optional pre-processing step 1630 of FIG. 16. In step 1764, the FCC makes a change to a first flight characteristic. In step 1766, the FCC changes the first operating condition of the FCS to the second operating condition of the FCS in correspondence to, in congruence with, or otherwise appreciating, an expected change in a second flight characteristic inherently-coupled to, or convolved with, the first flight characteristic (as previously discussed) in order to counteract or otherwise address the expected change in the second flight characteristic (e.g., main rotor tilt engagement affecting a rolling maneuver may require modification of the collective). Thereafter optional post-processing may be performed in step 1768. Optional post-processing 1768 may identically include or find correspondence to same or similar, or different, elements as optional post-processing step 1670 of FIG. 16. That is to say, some or all of optional post-processing 1768 may be a subset of optional post-processing step 1670 of FIG. 16.

In an embodiment, a representative fly-by-wire (FBW) flight control system includes a rotorcraft flight control computer (FCC) having a control law, the control law operable to engage a level-and-climb command in response to a switch of a pilot control assembly (PCA) being selected, wherein the level-and-climb command is configured to establish a roll-neutral orientation and increase altitude of the rotorcraft. The switch may be disposed on a collective control of the PCA. Selection of the switch may comprise a button depress. The switch may be a button disposed on a grip of the collective control. The level-and-climb command may comprise a roll command and a collective pitch command. The control law may be further operable to at least one of increase or decrease forward airspeed. Operability to engage a level-and-climb may include selection of the switch engaging a go-around guidance mode wherein the flight control system (FCS) is coupled to a guidance mode (e.g., flight director).

In another embodiment, a representative method includes steps of: operating a rotorcraft in a first operating condition of a flight control system (FCS), the rotorcraft having a flight control computer (FCC) in electrical communication between the FCS and a pilot control assembly (PCA); the FCC receiving a first pilot command to engage a maneuver based on selection of a switch of the PCA; and in response to the first pilot command to engage the maneuver, the FCC transitioning to a second operating condition, wherein the second operating condition comprises the rotorcraft in a roll-neutral attitude with increasing altitude. The FCC transitioning to the second operating condition may comprise steps of: changing a first flight characteristic, wherein changing the first flight characteristic would result in an expected change to a second flight characteristic, and wherein the first flight characteristic and the second flight characteristic have an inherently-coupled relationship; instructing the FCS to change the first operating condition of the FCS based on the inherently-coupled relationship; and in response to the expected change to the second flight characteristic, instructing the FCS to transition to the second operating condition of the FCS, wherein the second operating condition is operable to at least partially offset the expected change to the second flight characteristic such that the FCS is operable to at least partially decouple the inherently-coupled relationship of the first flight characteristic and the second flight characteristic. The switch may be disposed on a collective control of the PCA. The switch may comprise a button disposed on a grip of the collective control. The FCC may maintain the maneuver until the rotorcraft achieves a predetermined altitude. The FCC may maintain the maneuver until the FCC receives a second pilot command, the second pilot command different than the first pilot command. The FCC may receive the second pilot command from a cyclic control of the PCA. The method may further comprise, in response to the second pilot command, the FCC washing out transition to the second operating condition over a duration of time. The duration of time may be less than about 10 seconds. The FCC may determine a collective pitch angle of the second operating condition corresponding to a desired climb rate. The desired climb rate may be in a range of about 750 feet per minute (fpm) to about 1000 fpm. The collective pitch angle may be determined based on forward airspeed of the rotorcraft. The FCC may determine forward airspeed from at least one sensor of the rotorcraft. The method may further comprise, in response to the first pilot command to engage the maneuver, the FCC increasing or decreasing forward airspeed of the rotorcraft. The maneuver may comprise a go-around maneuver or an abort maneuver. The first operating condition may comprise an extreme attitude or orientation of the rotorcraft.

In yet another representative embodiment, a rotorcraft includes: a power train coupled to a body, the power train comprising a power source and a drive shaft coupled to the power source; a rotor system coupled to the power train and comprising a plurality of rotor blades; a flight control system (FCS) operable to change at least one operating condition of the rotor system; a pilot control assembly (PCA) configured to receive commands from a pilot, wherein the FCS is a fly-by-wire flight control system in electrical communication with the PCA; and a flight control computer (FCC) in electrical communication between the FCS and the PCA. The FCC is configured to: receive, from a switch of the PCA, a first pilot command to engage a maneuver; and, in response to the first pilot command to engage the maneuver, the FCC transitioning to a second operating condition of the rotor system, wherein the second operating condition of the rotor system comprises the rotorcraft in a roll-neutral orientation and the rotorcraft increasing altitude. The FCC may be configured to: alter a first flight characteristic, wherein alteration of the first flight characteristic would result in an anticipated change to a second flight characteristic; in response to the first pilot command to engage the maneuver, instruct the FCS to change a first operating condition of the rotor system based on a convolved relationship between the first flight characteristic and the second flight characteristic; and in response to the anticipated change to the second flight characteristic, instruct the FCS to transition to the second operating condition of the rotor system, wherein the second operating condition of the rotor system is operable to at least partially counter the anticipated change to the second flight characteristic such that the FCS is operable to at least partially separate convolved flight characteristics. The switch may comprise a button that is disposed on a grip of a collective control of the PCA. The FCC may be further configured to maintain the maneuver until the rotorcraft achieves a predetermined altitude or the FCC receives a second pilot command, the second pilot command different than the first pilot command, the second pilot command received from a cyclic control of the PCA. The FCC may be further configured to wash out transition to the second operating condition over a duration of time less than about 10 seconds. The FCC may be further configured to compute a collective pitch angle of the second operating condition corresponding to a desired climb rate. The desired climb rate may be in a range of about 750 feet per minute (fpm) to about 1000 fpm. The FCC may be further configured to compute the collective pitch angle based on forward airspeed of the rotorcraft and at least one of ambient temperature or altitude above sea level. The FCC may be further configured to determine forward airspeed based on data received from at least one sensor. The FCC may be further configured to increase or decrease forward airspeed of the rotorcraft in response to the first pilot command. The maneuver may comprise a go-around maneuver, an abort maneuver, or a recovery-from-extreme-attitude maneuver. The rotor system may comprise at least one of a main rotor system and a tail rotor system.

As used herein, the terms "comprises," "comprising," "includes," "including," "has," "having," or any contextual variant thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Furthermore, unless expressly stated to the contrary, "or" refers to an inclusive or and not an exclusive or. That is, the term "or" as used herein is generally intended to mean "and/or" unless otherwise indicated. For example, a condition "A or B" is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural connotations for such term, unless the context clearly indicates otherwise.

As used herein, the terms "measure," "measuring," "measurement," "determining," "determination," "detecting," "detection," "detector," "sensing," "sensor," or contextual variants thereof, refer to functions or device components that assign or otherwise provide an output value for at least one of a direct measurement, an in-direct measurement, or a computed measurement. For example, a determination or detection of an angle between two lines may comprise a direct measurement of the angle between the lines, an indirect measurement of the angle (e.g., as in the case of extending the length of two non-parallel lines outside the area of observation so as to predict their angle of intersection), or a computed measurement (e.g., using trigonometric functions to calculate an angle). Accordingly, "determining" the angle of intersection may be regarded as equivalent to "detecting" the angle of intersection, and a "detector" for determining the angle may be regarded as directly measuring, indirectly measuring, or computing the angle between the lines.

As previously discussed, representative embodiments of the disclosure may be implemented in a computer communicatively coupled to a network. The network may include, for example, a public network, a private network, the Internet, an intranet, an internet, a wide area network (WAN), a local area network (LAN), a storage area network (SAN), a personal area network (PAN), a metropolitan area network (MAN), a satellite network, a public switched telephone network (PSTN), a cellular network, an optical network, a local network, a regional network, a global network, a wireless network, a wireline network, another computer, a standalone computer, or the like. As is known to those skilled in the art, a computer may include a central processing unit ("CPU") or processor, at least one read-only memory ("ROM"), at least one random access memory ("RAM"), at least one hard disc drive ("HDD"), and one or more input/output ("I/O") devices. I/O devices may include a keyboard, monitor, printer, electronic pointing device (e.g., mouse, trackball, stylus, etc.), or the like. In various embodiments, a server computer may have access to at least one database over a network. The database may be local or remote to a server computer.

Additionally, representative functions may be implemented on one computer or shared, or otherwise distributed, among two or more computers in or across a network. Communications between computers may be accomplished using any electronic signals, optical signals, radio frequency signals, or other suitable methods or tools of communication in compliance with network protocols now known or otherwise hereafter derived. It will be understood for purposes of this disclosure that various flight control embodiments may comprise one or more computer processes, computing devices, or both, configured to perform one or more functions. One or more interfaces may be presented that can be utilized to access these functions. Such interfaces include application programming interfaces (APIs), interfaces presented for remote procedure calls, remote method invocation, or the like.

Any suitable programming language(s) can be used to implement the routines, methods, programs, or instructions of embodiments described herein, including; e.g., C, C#, C++, Java, Ruby, MATLAB, Simulink, assembly language, or the like. Different programming techniques may be employed, such as procedural or object oriented ontologies. Any particular routine can execute on a single computer processing device or multiple computer processing devices, a single computer processor, or multiple computer processors. Data may be stored in a single storage medium or distributed across multiple storage mediums, and may reside in a single database or multiple databases (or other data storage techniques).

Although steps, operations, or computations may be presented in a specific order, this order may be changed in different embodiments. In some embodiments, to the extent multiple steps are shown as sequential in the preceding description, some combination of such steps in alternative embodiments may be performed at a same time. The sequence of operations described herein may be interrupted, suspended, or otherwise controlled by another process, such as an operating system, kernel, daemon, or the like. The routines can operate in an operating system environment or as stand-alone routines. Functions, routines, methods, steps, or operations described herein can be performed in hardware, software, firmware, or any combination thereof.

Embodiments described herein may be implemented in the form of control logic in software or hardware, or a combination of both. Control logic may be stored in an information storage medium, such as a computer-readable medium, as a plurality of instructions adapted to direct an information processing device to perform a set of steps disclosed in various embodiments. Based on the disclosure and teachings provided herein, a person of ordinary skill in the art will appreciate other ways or methods to implement similar, or substantially similar, functionality.

It is also within the spirit and scope herein to implement, in software, programming, or other steps, operations, methods, routines, or portions thereof described herein, where such software programming or code can be stored in a computer-readable medium and can be operated on by a processor to permit a computer to perform any of the steps, operations, methods, routines, or portions thereof described herein. Embodiments may be implemented using software programming or code in one or more general purpose digital computers, by using, e.g., application specific integrated circuits (ASICs), programmable logic devices, field programmable gate arrays (FPGAs), or optical, quantum, or nano-engineered systems, components, or mechanisms. In general, functions disclosed herein may be achieved by any means, whether now known or hereafter derived in the art. For example, distributed or networked systems, components, or circuits can be used. In another example, communication or transfer (or otherwise moving from one place to another) of data may be wired, wireless, or accomplished by any other means.

A "computer-readable medium" may be any medium that can contain, store, communicate, propagate, or transport a program for use by or in connection with the instruction execution system, apparatus, system, or device. The computer-readable medium can be, but is not limited to, an electronic, magnetic, optical, electromagnetic, infrared, or semiconductor system, apparatus, system, device, propagation medium, or computer memory. Such computer-readable medium will generally be machine readable and include software programming or code susceptible to being human readable (e.g., source code) or machine readable (e.g., object code).

A "processor" includes any hardware system, mechanism or component that processes data, signals, or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," or the like. Portions of processing may be performed at different (or same) times and at different (or same) locations by different (or same) processing systems.

It will also be appreciated that one or more elements depicted in the Figures may also be implemented in a more-separated or more-integrated manner, or even removed or rendered inoperable in certain cases, as may be useful in accordance with particular applications and embodiments. Additionally, any signal lines or arrows in the Figures should be considered only as representative, and therefore not limiting, unless otherwise specifically noted.

Examples or illustrations provided herein are not to be regarded in any way as restrictions on, limits to, or express definitions of any term or terms with which they are associated. Instead, these examples or illustrations are to be regarded as being described with respect to a particular embodiment and as merely illustrative. Those skilled in the art will appreciate that any term or terms with which these examples or illustrations are associated will encompass other embodiments that may or may not be given therewith or elsewhere in the specification, and all such embodiments are intended to be included within the scope of that term or terms. Language designating such non-limiting examples and illustrations includes, but is not limited to: "for example," "for instance," "e.g.," "etc., "or the like," "in a representative embodiment," "in one embodiment," "in another embodiment," or "in some embodiments." Reference throughout this specification to "one embodiment," "an embodiment," "a representative embodiment," "a particular embodiment," or "a specific embodiment," or contextually similar terminology, means that a particular feature, structure, property, or characteristic described in connection with the described embodiment is included in at least one embodiment, but may not necessarily be present in all embodiments. Thus, respective appearances of the phrases "in one embodiment," "in an embodiment," or "in a specific embodiment," or similar terminology in various places throughout the description are not necessarily referring to the same embodiment. Furthermore, particular features, structures, properties, or characteristics of any specific embodiment may be combined in any suitable manner with one or more other embodiments.

The scope of the present disclosure is not intended to be limited to the particular embodiments of any process, product, machine, article of manufacture, assembly, apparatus, means, methods, or steps herein described. As one skilled in the art will appreciate, various processes, products, machines, articles of manufacture, assemblies, apparatuses, means, methods, or steps, whether presently existing or later developed, that perform substantially the same function or achieve substantially the same result in correspondence to embodiments described herein, may be utilized according to their description herein. The appended claims are intended to include within their scope such processes, products, machines, articles of manufacture, assemblies, apparatuses, means, methods, or steps.

Benefits, other advantages, and solutions to problems have been described herein with regard to representative embodiments. However, any benefits, advantages, solutions to problems, or any component thereof that may cause any benefit, advantage, or solution to occur or to become more pronounced are not to be construed as critical, required, or essential features or components.

What is claimed is:

1. A fly-by-wire (FBW) flight control system for a rotorcraft, comprising:
    a rotorcraft flight control computer (FCC) performing a series of control laws, the control laws operable to establish a roll-neutral orientation and increase altitude of the rotorcraft by:
    receiving a non-neutral sensed roll orientation and smoothly transitioning the roll orientation from the non-neutral sensed roll orientation to the roll-neutral orientation; and
    wherein smoothly transitioning the roll orientation from the non-neutral roll orientation to the roll-neutral orientation includes filtering an initial roll angle value and a desired neutral roll angle value through a lag filter to establish a roll target and generating a roll command based upon the roll target and based upon a feedback signal.

2. The FBW flight control system of claim 1, wherein the FCC establishes the roll-neutral orientation and increases altitude of the rotorcraft in response to sending an extreme attitude of the rotorcraft.

3. The FBW flight control system of claim 1, wherein the control laws are further operable to at least one of increase or decrease forward airspeed.

4. The FBW flight control system of claim 1, wherein the FCC is further configured to:
    change a first flight characteristic, wherein changing the first flight characteristic would result in an expected change to a second flight characteristic, and wherein the first flight characteristic and the second flight characteristic have an inherently-coupled relationship;
    change a first operating condition of the rotorcraft based on the inherently-coupled relationship; and
    in response to the expected change to the second flight characteristic, transition to a second operating condition of the rotorcraft, wherein the second operating condition is operable to at least partially offset the expected change to the second flight characteristic.

5. The FBW flight control system of claim 1, wherein the FCC is configured to establish a roll-neutral orientation and increase altitude of the rotorcraft in response to commands received from a pilot.

6. The FBW flight control system of claim 5, wherein the pilot operates the rotorcraft remotely.

7. The FBW flight control system of claim 1, wherein the FCC is further configured to operate the rotorcraft without a pilot aboard the rotorcraft.

8. A method, comprising:
    operating a rotorcraft in a first operating condition under the control of a flight control computer (FCC);

transitioning the rotorcraft to a second operating condition under the control of the FCC, wherein the second operating condition comprises placing the rotorcraft in a roll-neutral attitude with increasing altitude; and wherein transitioning to a second operating condition includes (i) determining from a sensed roll angle and a desired roll angle a roll target, and (ii) based upon feedback from the rotorcraft and the roll target, establishing a roll command to achieve the roll-neutral attitude; and (i) linearly ramping the roll target from the sensed roll angle to the desired roll angle, or (ii) providing a fixed rate of change in roll attitude from the sensed roll angle to the desired roll angle.

9. The method of claim 8, transitioning the rotorcraft to a second operating condition under the control of the FCC comprises:

changing a first flight characteristic, wherein changing the first flight characteristic would result in an expected change to a second flight characteristic, and wherein the first flight characteristic and the second flight characteristic have an inherently-coupled relationship;

instructing the FCS to change the first operating condition of the FCS based on the inherently-coupled relationship; and in response to the expected change to the second flight characteristic, instructing the FCS to transition to the second operating condition of the FCS, wherein the second operating condition is operable to at least partially offset the expected change to the second flight characteristic.

10. The method of claim 8, further comprising the FCC maintaining the second operating condition until the rotorcraft achieves a predetermined flight parameter.

11. The method of claim 10, wherein the predetermined flight parameter is a desired altitude.

12. The method of claim 8 further comprising:

FCC washing out transition to the second operating condition over a duration of time; and the FCC determining a collective pitch angle of the second operating condition corresponding to a desired climb rate.

13. The method of claim 8, wherein transitioning the rotorcraft to a second operating condition under the control of the FCC occurs in response to a condition selected from the group consisting of a pilot input command and detection of an extreme attitude of the rotorcraft.

14. A rotorcraft configured for fly-by-wire (FBW) flight, the rotorcraft comprising:

a power train coupled to a body, the power train comprising a power source and a drive shaft coupled to the power source;

a rotor system coupled to the power train and comprising a plurality of rotor blades;

a flight control system (FCS) operable to change at least one operating condition of the rotor system;

a flight control computer (FCC) in electrical communication between the FCS and configured to establish a roll-neutral orientation and increase altitude of the rotorcraft by:

receiving a non-neutral sensed roll orientation and smoothly transitioning the roll orientation from the non-neutral sensed roll orientation to the roll-neutral orientation; and wherein smoothly transitioning the roll orientation from the non-neutral roll orientation to the roll-neutral orientation comprises (i) linearly ramping a roll target from an initial value to a desired value over a specified period of time, or (ii) providing a fixed rate of change in roll attitude from an initial value to a desired value.

15. The rotorcraft of claim 14, wherein the FCC is further configured to:

alter a first flight characteristic, wherein alteration of the first flight characteristic would result in an anticipated change to a second flight characteristic;

instruct the FCS to change a first operating condition of the rotor system based on a convolved relationship between the first flight characteristic and the second flight characteristic; and in response to the anticipated change to the second flight characteristic, instruct the FCS to transition to a second operating condition of the rotor system, wherein the second operating condition of the rotor system is operable to at least partially counter the anticipated change to the second flight characteristic such that the FCS is operable to at least partially separate convolved flight characteristics.

16. The rotorcraft of claim 14, wherein the FCC is further configured to maintain the maneuver until the rotorcraft achieves a predetermined altitude.

17. The rotorcraft of claim 14, wherein the FCC is further configured to establish a roll-neutral orientation and increase altitude of the rotorcraft in response to a pilot input command.

18. The rotorcraft of claim 14, wherein the FCC is further configured to establish a roll-neutral orientation and increase altitude of the rotorcraft in response to detection of an extreme attitude of the rotorcraft.

19. The rotorcraft of claim 14, wherein the FCC is further configured to operate the rotorcraft without a pilot on board the rotorcraft.

20. The rotorcraft of claim 15, wherein the FCC is configured to wash out transition to the second operating condition over a duration of time less than about 10 seconds.

* * * * *

UNITED STATES PATENT AND TRADEMARK OFFICE
CERTIFICATE OF CORRECTION

| | |
|---|---|
| PATENT NO. | : 11,472,535 B2 |
| APPLICATION NO. | : 16/877365 |
| DATED | : October 18, 2022 |
| INVENTOR(S) | : Robert Earl Worsham, II et al. |

It is certified that error appears in the above-identified patent and that said Letters Patent is hereby corrected as shown below:

In the Claims

Claim 2, Column 22, Line 37; delete "sending" and insert --sensing--.

Signed and Sealed this
Thirteenth Day of December, 2022

Katherine Kelly Vidal
*Director of the United States Patent and Trademark Office*